(12) United States Patent
Epstein et al.

(10) Patent No.: US 7,322,731 B2
(45) Date of Patent: *Jan. 29, 2008

(54) COLOR MIXING ILLUMINATION LIGHT UNIT AND SYSTEM USING SAME

(75) Inventors: Kenneth A. Epstein, St. Paul, MN (US); Michael F. Weber, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 291 days.

This patent is subject to a terminal disclaimer.

(21) Appl. No.: 11/166,722

(22) Filed: Jun. 24, 2005

(65) Prior Publication Data

US 2006/0291238 A1 Dec. 28, 2006

(51) Int. Cl.
*F21V 7/04* (2006.01)

(52) U.S. Cl. .................. 362/609; 362/231; 362/601; 362/607; 362/611; 362/612; 362/613; 349/63; 349/65

(58) Field of Classification Search ............... 362/231, 362/293, 601, 604, 607, 609, 611–613; 349/63, 349/65
See application file for complete search history.

(56) References Cited

U.S. PATENT DOCUMENTS

| | | | |
|---|---|---|---|
| 5,422,756 A | 6/1995 | Weber | |
| 5,712,694 A | 1/1998 | Taira et al. | |
| 5,751,388 A | 5/1998 | Larson | |
| 5,793,456 A | 8/1998 | Broer et al. | |
| 5,825,543 A | 10/1998 | Ouderkirk et al. | |
| 5,867,316 A | 2/1999 | Carlson et al. | |
| 5,882,774 A | 3/1999 | Jonza et al. | |
| 5,995,690 A | 11/1999 | Kotz et al. | |
| 6,122,103 A | 9/2000 | Perkins et al. | |
| 6,208,466 B1 | 3/2001 | Liu et al. | |

(Continued)

FOREIGN PATENT DOCUMENTS

EP   1 072 637   1/2001

(Continued)

OTHER PUBLICATIONS

"Guideline for the Construction of Thin Light-Boxes using 3M Optical Lighting Film", 3M, St. Paul, Minnesota, Jan. 2000, pp. 1-12.

(Continued)

*Primary Examiner*—Sandra O'Shea
*Assistant Examiner*—Meghan K. Dunwiddie
(74) *Attorney, Agent, or Firm*—Jay R. Pralle

(57) ABSTRACT

An illumination light unit includes at least two light sources that generate light at different wavelengths. The illumination light unit also includes a reflecting cavity having one or more reflectors and a controlled transmission mirror disposed at an output of the reflecting cavity. The controlled transmission mirror includes an input coupling element, an output coupling element and a first multilayer reflector disposed between the input and output coupling elements. At least some of the light from the light sources is reflected within the reflecting cavity by the one or more reflectors and is mixed. Light passes out of the reflecting cavity through the controlled transmission mirror. The illumination light unit may be used for illumination purposes, or as part of a backlight for illuminating a display.

31 Claims, 15 Drawing Sheets

U.S. PATENT DOCUMENTS

| | | |
|---|---|---|
| 6,531,230 B1 | 3/2003 | Weber et al. |
| 6,590,705 B1 | 7/2003 | Allen et al. |
| RE38,305 E | 11/2003 | Gunjima et al. |
| 7,259,803 B2 | 8/2007 | Akada et al. |
| 2001/0050816 A1 | 12/2001 | Suzuki et al. |
| 2002/0159019 A1 | 10/2002 | Pokorny et al. |
| 2003/0118805 A1 | 6/2003 | Kretman et al. |
| 2003/0164904 A1 | 9/2003 | Grohn et al. |
| 2004/0105617 A1 | 6/2004 | Cornelissen et al. |
| 2004/0119910 A1 | 6/2004 | Maeda et al. |
| 2004/0141103 A1 | 7/2004 | Kotchick et al. |
| 2004/0228106 A1 | 11/2004 | Stevenson et al. |
| 2004/0234724 A1 | 11/2004 | Kaminsky et al. |
| 2005/0094401 A1 | 5/2005 | Magarill |
| 2005/0255407 A1 | 11/2005 | Kuwabara |
| 2005/0265029 A1 | 12/2005 | Epstein et al. |
| 2006/0193577 A1 | 8/2006 | Ouderkirk et al. |
| 2006/0193578 A1 | 8/2006 | Oderkirk et al. |
| 2006/0193589 A1 | 8/2006 | Reker et al. |
| 2006/0290842 A1 | 12/2006 | Epstein et al. |
| 2006/0290843 A1 | 12/2006 | Epstein et al. |
| 2006/0290844 A1* | 12/2006 | Epstein et al. ............... 349/113 |
| 2006/0290845 A1 | 12/2006 | Hebrink et al. |

FOREIGN PATENT DOCUMENTS

| | | |
|---|---|---|
| EP | 1 341 006 | 9/2003 |
| EP | 1 521 235 | 4/2005 |
| JP | 10-036655 | 2/1998 |
| JP | 2004/114617 | 9/2002 |
| JP | 2004/315544 | 2/2003 |
| JP | 35-044264 | 7/2004 |
| JP | 2004/277657 | 10/2004 |
| WO | 1995/017303 | 6/1995 |
| WO | 1999/021913 | 5/1999 |
| WO | 1999/056158 | 11/1999 |
| WO | WO 00/75560 A1 | 12/2000 |
| WO | WO 01/31393 | 5/2001 |
| WO | 2002/03153 | 4/2002 |
| WO | WO 2004/068182 A1 | 8/2004 |
| WO | WO 2005/006036 A1 | 1/2005 |
| WO | 2006/044475 | 4/2006 |

OTHER PUBLICATIONS

Optical Lighting Film Application Bulletin, "Thin Sign Box Sheets," 3M Specified Construction Products Department ,Technical Bulletin, 3M, St. Paul, Minnesota, Feb. 1, 2001, pp. 1-8.

"Uniform Lighting Panel ULP 4×6 V," Consumer Safety and Light Management Department, Technical Specification, 3M, St. Paul, Minnesota, May 9, 2003, 2 pgs.

Kim, GeunHyung, A PMMA Composite as an Optical Diffuse in Liquid Crystal Display Backlighting Unit, Science Direct, European Polymer Journal, Feb. 25, 2005.

* cited by examiner

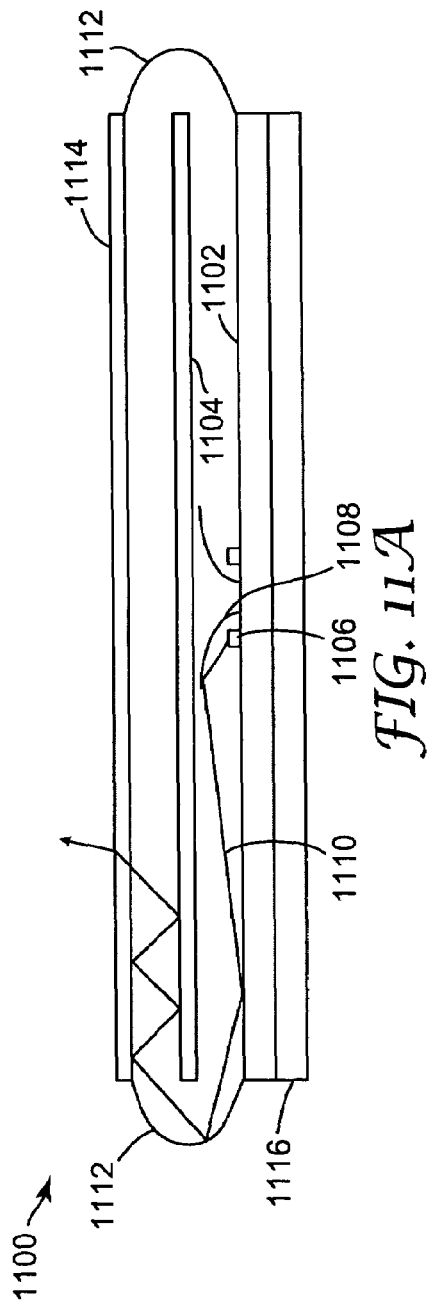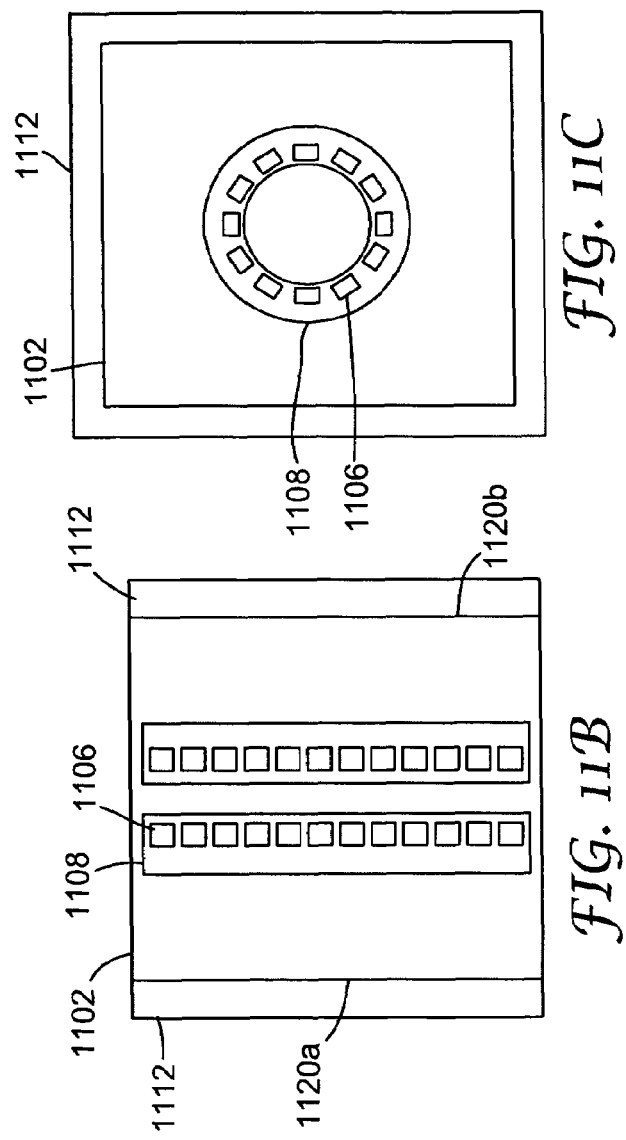

COLOR MIXING ILLUMINATION LIGHT UNIT AND SYSTEM USING SAME

RELATED APPLICATIONS

This application is related to the following applications, all of which are incorporated herein by reference: U.S. patent application Ser. No. 11/166,723, titled "OPTICAL ELEMENT FOR LATERAL LIGHT SPREADING IN BACK-LIT DISPLAYS AND SYSTEM USING SAME", filed on even date herewith and having U.S. patent application Ser. No. 11/167,003, titled "OPTICAL ELEMENT FOR LATERAL LIGHT SPREADING IN EDGE-LIT DISPLAYS AND SYSTEM USING SAME", filed on even date herewith and having U.S. patent application Ser. No. 11/167, 001, titled "ILLUMINATION ELEMENT AND SYSTEM USING SAME", filed on even date herewith and having and U.S. patent application Ser. No. 11/167,019, titled "POLARIZATION SENSITIVE ILLUMINATION ELEMENT AND SYSTEM USING SAME", filed on even date herewith and having.

FIELD OF THE INVENTION

The invention relates to optical lighting and displays, and more particularly to signs and display systems that are illuminated by backlights.

BACKGROUND

Liquid crystal displays (LCDs) are optical displays used in devices such as laptop computers, hand-held calculators, digital watches and televisions. Some LCDs, for example in laptop computers, cell phones and certain LCD monitors and LCD televisions (LCD-TVs), are illuminated from behind using a backlight that has a number of light sources positioned to the side of the display panel. The light is guided from the light sources using a light guide that is positioned behind the display. The light guide is typically configured to extract the light from the light guide and to direct the light towards the display panel. This arrangement is commonly referred to as an edge-lit display, and is often used in applications where the display is not too large and/or the displayed image does not have to be very bright. For example, most computer monitors are viewed from a close distance, and so do not have to be as bright as an equivalently sized television display, which is typically viewed from a greater distance.

In larger, or brighter displays, the backlight tends to employ light sources positioned directly behind the display panel. One reason for this is that the light power requirements to achieve a certain level of display brightness increase with the square of the display size. Since the available real estate for locating light sources along the side of the display only increases linearly with display size, there comes a point where the light sources have to be placed behind the panel rather than to the side in order to achieve the desired level of brightness.

One important aspect of the backlight is that the light illuminating the display panel should be uniformly bright. Illuminance uniformity is particularly a problem when the light sources used are point sources, for example are light emitting diodes (LEDs). In such cases the backlight is required to spread the light across the display panel so that the displayed image has no dark areas. In addition, in some applications the display panel is illuminated with light from a number of different LEDs that produce light of different colors. It is important in these situations that the light from the different LEDs be mixed so that the color, as well as the brightness, are uniform across the displayed image.

SUMMARY OF THE INVENTION

One embodiment of the invention is directed to an optical system that has an image-forming panel having an illumination side and a backlight unit disposed to the illumination side of the image-forming panel. The backlight unit includes at least first and second light sources, the first light source producing light at a first wavelength and the second light source producing light at a second wavelength different from the first wavelength. The backlight unit also includes a reflecting cavity having at least one reflecting surface and a controlled transmission mirror. The light from the first and second light sources is reflected within the reflecting cavity. The controlled transmission mirror has an input coupling element, an output coupling element and a first multilayer reflector between the input and output coupling elements. The first multilayer reflector is reflective for normally incident light from the first and second light sources. The input coupling element redirects at least some of the light propagating from the first and second light sources in a direction substantially perpendicular to the first multilayer reflector into a direction that is transmitted through the first multilayer reflector.

Another embodiment of the invention is directed to an illumination light unit that has at least a first light source capable of generating illumination light at a first wavelength and a second light source capable of generating illumination light at a second wavelength different from the first wavelength. The illumination light unit also includes a reflecting cavity having one or more reflectors and a controlled transmission mirror disposed at an output of the reflecting cavity. The controlled transmission mirror includes an input coupling element, an output coupling element and a first multilayer reflector disposed between the input and output coupling elements. At least some of the illumination light from the first and second light sources is reflected within the reflecting cavity by the one or more reflectors and is transmitted out of the reflecting cavity through the controlled transmission mirror.

The above summary of the present invention is not intended to describe each illustrated embodiment or every implementation of the present invention. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 11A-11C schematically illustrate additional exemplary embodiments of light illumination units having a controlled transmission mirror according to principles of the present invention.

Figure 1A:
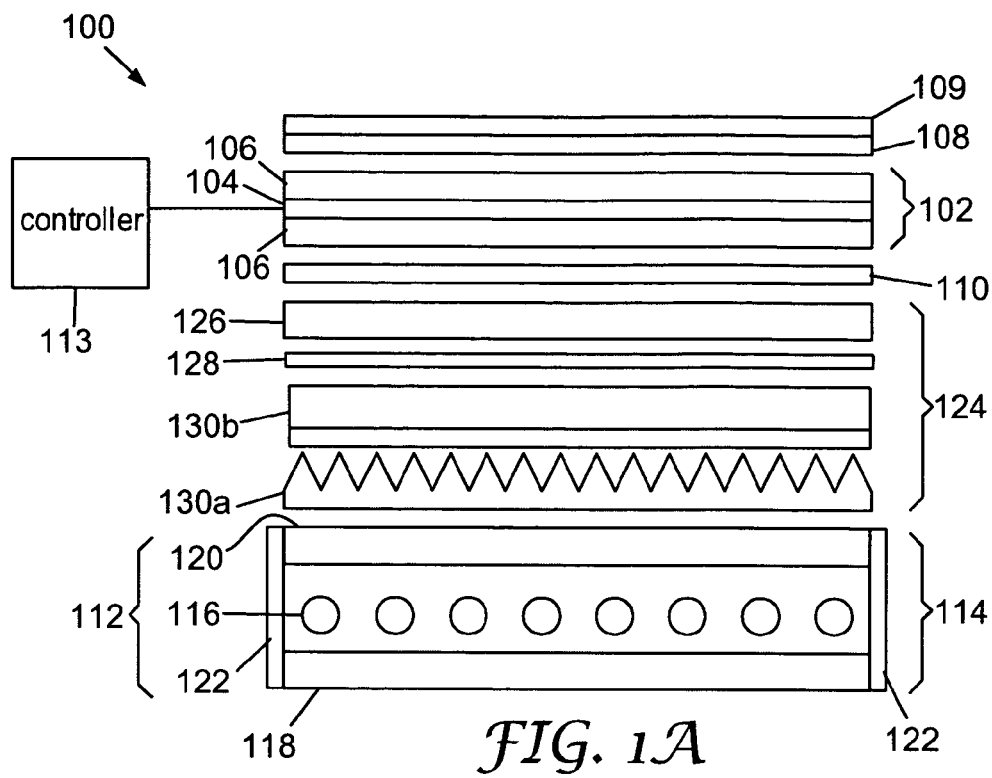
FIG. 1A schematically illustrates a back-lit liquid crystal display (LCD) device that has an illumination light unit having a controlled transmission mirror according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to illuminated signs and displays, such as liquid crystal displays (LCDs, or LC displays), and is applicable to displays that are illuminated using light sources positioned directly behind the display panel, known as direct-lit displays, and to displays that are illuminated using light sources positioned to the side of the display panel, known as edge-lit displays. The invention is believed to be particularly useful for displays that are illuminated by light sources of different colors. The invention is believed also to be applicable to systems that provide space lighting.

A schematic exploded view of an exemplary embodiment of a direct-lit display system 100 is presented in FIG. 1A. Such a display system 100 may be used, for example, in an LCD monitor or LCD-TV. In this exemplary embodiment, the device 100 uses a liquid crystal (LC) display panel 102, which typically comprises a layer of LC 104 disposed between panel plates 106. The plates 106 are often formed of glass, and may include electrode structures and alignment layers on their inner surfaces for controlling the orientation of the liquid crystals in the LC layer 104. The electrode structures are commonly arranged so as to define LC panel pixels, areas of the LC layer where the orientation of the liquid crystals can be controlled independently of adjacent pixels. A color filter may also be included with one or more of the plates 106 for imposing color on the displayed image.

An upper absorbing polarizer 108 is positioned above the LC layer 104 and a lower absorbing polarizer 110 is positioned below the LC layer 104. In the illustrated embodiment, the upper and lower absorbing polarizers 108, 110 are located outside the display panel 102. The absorbing polarizers 108, 110 and the display panel 102, in combination, control the transmission of light from a backlight 112 through the display panel 102 to the viewer. In some exemplary embodiments, when a pixel of the LC layer 104 is not activated, it does not change the polarization of light passing therethrough. Accordingly, light that passes through the lower absorbing polarizer 110 is absorbed by the upper absorbing polarizer 108, when the absorbing polarizers 108, 110 are aligned perpendicularly. When the pixel is activated, on the other hand, the polarization of the light passing therethrough is rotated, so that at least some of the light that is transmitted through the lower absorbing polarizer 110 is also transmitted through the upper absorbing polarizer 108. Selective activation of the different pixels of the LC layer 104, for example using a controller 113, results in the light passing out of the display 100 at certain desired locations, thus forming an image seen by the viewer. The controller 113 may include, for example, a computer or a television controller that receives and displays television images. One or more optional layers 109 may be provided over the upper absorbing polarizer 108, for example to provide mechanical and/or environmental protection to the display surface. In one exemplary embodiment, the layer 109 may include a hardcoat over the absorbing polarizer 108.

Some types of LC displays may operate in a manner different from that described above and, therefore, differ in detail from the described system. For example, the absorbing polarizers may be aligned parallel and the LC panel may rotate the polarization of the light when in an unactivated state. Regardless, the basic structure of such displays remains similar to that described above.

The backlight 112 generates illumination light and directs the light towards the back of the LC panel 102. The backlight 112 comprises a reflecting cavity 114 that contains a number of light sources 116 for generating the light, or that receives light from the light sources 116. The light sources 116 may be, for example, light emitting diodes (LEDs), organic LEDs. (OLEDs), or may be other types of light sources.

The reflecting cavity 114 may include a base reflector 118 that reflects light propagating downwards from the light sources 116 in a direction away from the display panel 102. The base reflector 118 may also be useful for recycling light within the display device 100, as is explained below. The base reflector 118 may be a specular reflector or may be a diffuse reflector. One example of a specular reflector that may be used as the base reflector 118 is Vikuiti™ Enhanced Specular Reflection (ESR) film available from 3M Company, St. Paul, Minn. Examples of suitable diffuse reflectors include polymers, such as polyethylene terephthalate (PET), polycarbonate (PC), polypropylene, polystyrene and the like, loaded with diffusely reflective particles, such as titanium dioxide, barium sulphate, calcium carbonate and the like. Other examples of diffuse reflectors, including microporous materials and fibril-containing materials, are discussed in co-owned U.S. Patent Application Publication 2003/0118805 A1, incorporated herein by reference.

The reflecting cavity 114 also includes a controlled transmission mirror 120 disposed between the light sources 116 and the display panel 102. The term cavity is used for an arrangement of the controlled transmission mirror and at least one reflecting surface, where at least some of the light is able to reflect back and forth between the controlled transmission mirror and the reflecting surface.

The controlled transmission mirror 120 reflects some of the light within the reflecting cavity 114 and also encourages light to spread laterally within the cavity 114. The lateral light spreading aids in making the intensity profile of the light that exits the controlled transmission mirror 120 uniform, so that the viewer sees a more uniformly illuminated image. In addition, where different light sources 116 produce light of different colors, the lateral spreading of the light results in a more complete mixing of the different colors, and so the viewer sees an image of a more uniform color. The operation of the controlled transmission mirror 120 is discussed in more detail below.

The cavity 114 may also be provided with reflecting walls 122. The reflecting walls 122 may be formed, for example, of the same specular or diffuse reflecting material as is used for the base reflector 118, or of some other type of reflecting material.

An arrangement of light management layers 124 may also be positioned between the cavity 114 and the display panel 102. The light management layers 124 affect the light propagating from the cavity 114 so as to improve the operation of the display device 100. For example, the light management layers 124 may include a reflective polarizer 126. This may be advantageous because the light sources 116 typically produce unpolarized light, whereas the lower absorbing polarizer 110 only transmits a single polarization state. Therefore, about half of the light generated by the light sources 116 is not suitable for transmission through to the LC layer 104. The reflecting polarizer 126, however, may be used to reflect the light that would otherwise be absorbed in the lower absorbing polarizer 110, and so this light may be recycled by reflection between the reflecting polarizer 126 and the cavity 114. The light reflected by the reflecting polarizing 126 may be subsequently reflected by the controlled transmission mirror 120 or the light may re-enter the cavity 114 and be reflected by the base reflector 118. At least some of the light reflected by the reflecting polarizer 126 may be depolarized and subsequently returned to the reflecting polarizer 126 in a polarization state that is transmitted through the reflecting polarizer 126 and the lower absorbing polarizer 110 to the display panel 102. In this manner, the reflecting polarizer 126 may be used to increase the fraction of light emitted by the light sources 116 that reaches the display panel 102, and so the image produced by the display device 100 is brighter.

Any suitable type of reflective polarizer may be used, for example, multilayer optical film (MOF) reflective polarizers, diffusely reflective polarizing film (DRPF), such as continuous/disperse phase polarizers, wire grid reflective polarizers or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774, incorporated herein by reference. Commercially available examples of MOF reflective polarizers include Vikuiti™ DBEF-D200 and DBEF-D400 multilayer reflective polarizers that include diffusive surfaces, available from 3M Company, St. Paul, Minn.

Examples of DRPF useful in connection with the present invention include continuous/disperse phase reflective polarizers as described in co-owned U.S. Pat. No. 5,825,543, incorporated herein by reference, and diffusely reflecting multilayer polarizers as described in, e.g., U.S. Pat. No. 5,867,316, also incorporated herein by reference. Other suitable types of DRPF are described in U.S. Pat. No. 5,751,388.

Some examples of wire grid polarizers useful in connection with the present invention include those described in U.S. Pat. No. 6,122,103. Wire grid polarizers are commercially available from, inter alia, Moxtek Inc., Orem, Utah.

Some examples of cholesteric polarizers useful in connection with the present invention include those described in, e.g., U.S. Pat. No. 5,793,456, and U.S. Patent Publication No. 2002/0159019. Cholesteric polarizers are often provided along with a quarter wave retarding layer on the output side, so that the light transmitted through the cholesteric polarizer is converted to linear polarization.

A polarization mixing layer 128 may be placed between the cavity 114 and the reflecting polarizer 126 to aid in mixing the polarization of the light reflected by the reflecting polarizer 126. For example, the polarization mixing layer 128 may be a birefringent layer such as a quarter-wave retarding layer.

The light management layers 124 may also include one or more prismatic brightness enhancing layers 130a, 130b. A prismatic brightness enhancing layer is one that includes a surface structure that redirects off-axis light into a propagation direction closer to the axis of the display. This controls the viewing angle of the illumination light passing through the LC panel 102, typically increasing the amount of light propagating on-axis through the LC panel 102. Consequently, the on-axis brightness of the image seen by the viewer is increased.

One example of a prismatic brightness enhancing layer has a number of prismatic ridges that redirect the illumination light, through a combination of refraction and reflection. Examples of prismatic brightness enhancing layers that may be used in the display device include the Vikuiti™ BEFII and BEFIII family of prismatic films available from 3M Company, St. Paul, Minn., including BEFII 90/24, BEFII 90/50, BEFIIIM 90/50, and BEFIIIT. It is possible that only one brightness enhancing layer is used, although it is also possible to use two brightness enhancing layers 130a, 130b, with their prismatic structures oriented at about 90° to each other. This crossed configuration provides control of the viewing angle of the illumination light in two dimensions, the horizontal and vertical viewing angles.

Figure 1B:
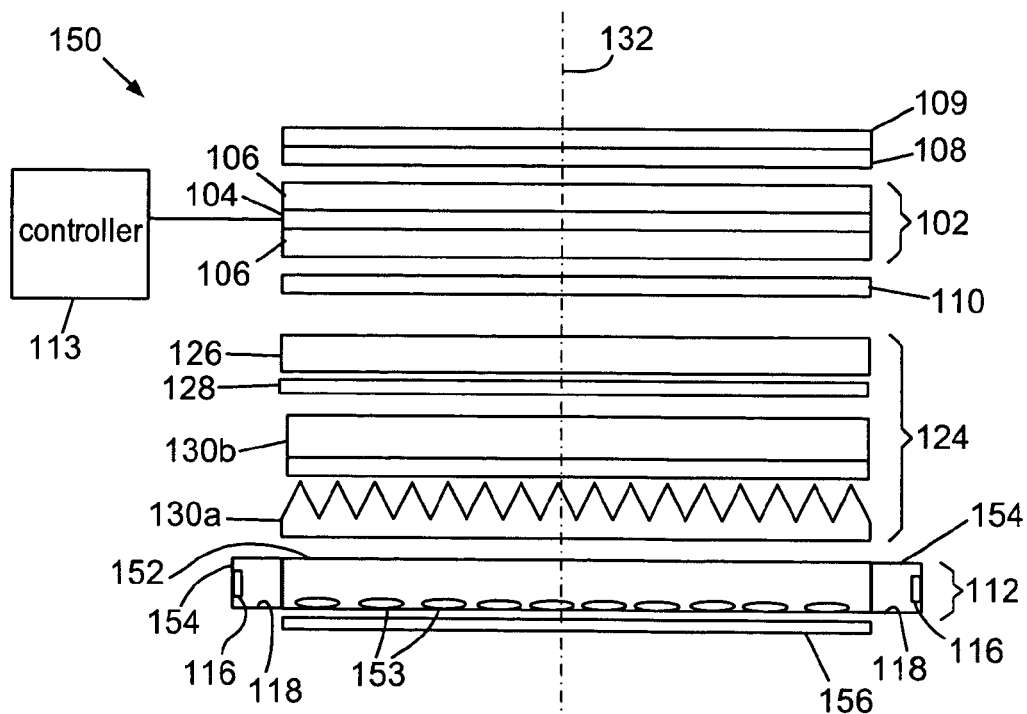
FIG. 1B schematically illustrates an edge-lit LCD device that has an illumination light unit having a controlled transmission mirror according to principles of the present invention.

An exemplary embodiment of a display device 150 that includes an edge-lit display is schematically illustrated in FIG. 1B. In this embodiment, the backlight 112 includes a light guide 152 and one or more illumination light units 154 that generate the illumination light and direct the illumination light into the light guide 152. The illumination light units 154 include a number of light sources 116 to generate the illumination light. The light sources 116 may be extended light sources that emit light over an extended length. One example of an extended light source is a cold cathode, fluorescent tube. The light sources 116 may also be effective point light sources, for example light emitting diodes (LEDs). Other types of light sources may also be used. This list of light sources is not intended to be limiting or exhaustive, but only exemplary.

The illumination light unit 154 may include a reflecting cavity that is used to collect and direct light from the light sources 116 to the lightguide 152. The lightguide 152 guides illumination light from the light sources 116 to an area behind the display panel 102, and directs the light to the display panel 102. The light guide 152 may receive illumination light through a single edge, or through multiple edges. In other embodiments, not illustrated, the light may be coupled into the light guide 152 through a light coupling mechanism other than the edge of the light guide 152. A base reflector 156 may be positioned on the other side of the light guide 152 from the display panel 102. The light guide 152 may include light extraction features 153 that are used to extract the light from the lightguide 152 for illuminating the display panel 102. For example, the light extraction features 153 may comprise diffusing spots on the surface of the light guide 152 that direct light either directly towards the display panel 102 or towards the base reflector 156. Other approaches may be used to extract the light from the light guide 152.

Figure 2A:
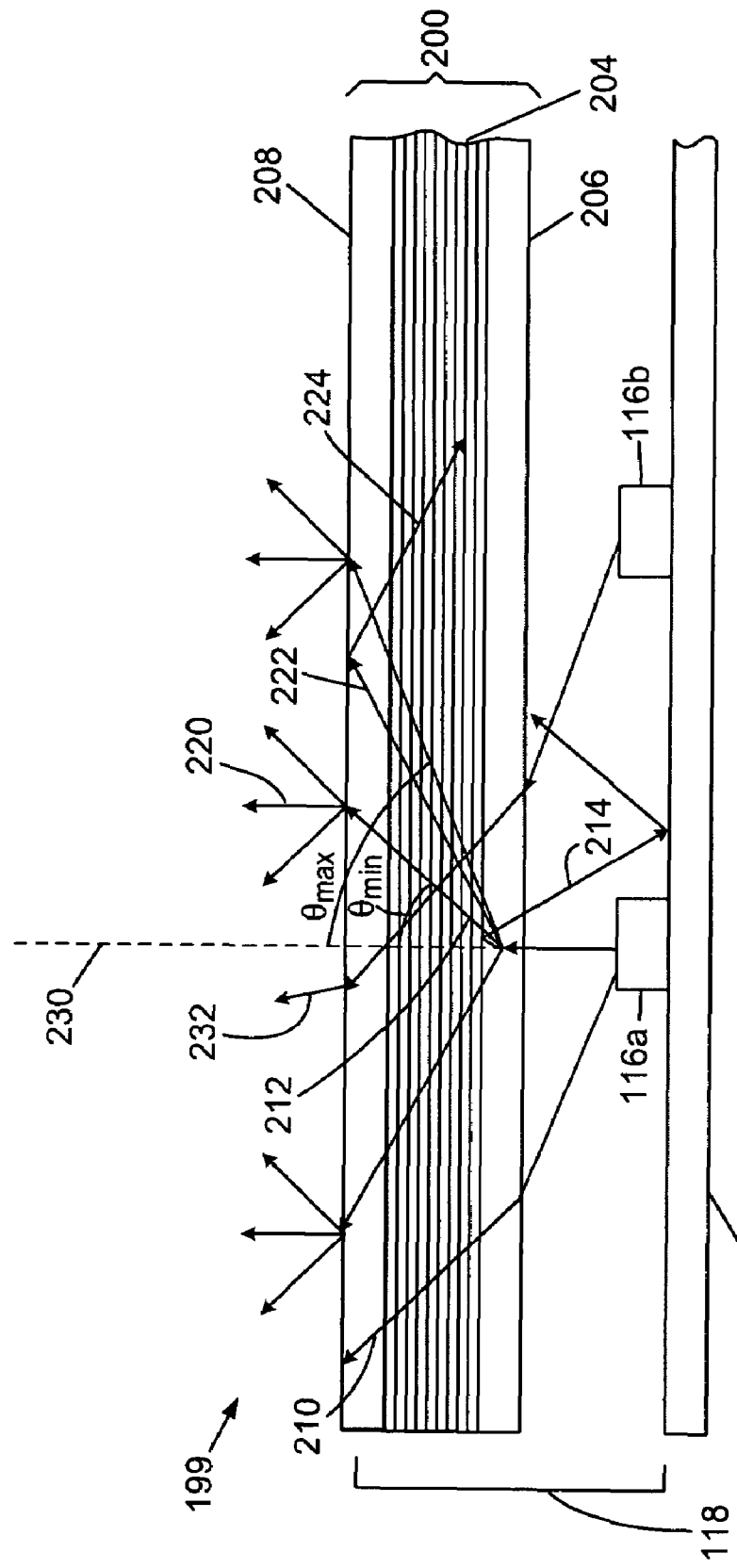
FIGS. 2A-2D schematically illustrate partial cross-sectional views of embodiments of illumination light units having a controlled transmission mirror according to principles of the present invention.

One exemplary embodiment of an illumination light unit 199 is now described with reference to FIG. 2A. The figure shows part of the light unit 199, including some light sources 116a, 116b. A reflecting cavity 118 may be formed between at least one reflecting surface 202 and a controlled transmission mirror 200 that are arranged so that at least some of the illumination light produced by the sources 116a, 116b is reflected by both the controlled transmission mirror 200 and the reflecting surface 202. In the illustrated embodiment, the reflecting surface 202 is positioned behind the light sources 116a, 116b.

The controlled transmission mirror 200 comprises a multilayer reflector 204 that has a reflection spectrum such that at least some of the light generated by the light sources 116a, 116b, when normally incident on the multilayer reflector 204, is reflected.

An input coupling element 206 is disposed at the lower side of the multilayer reflector 204, and an output coupling element 208 is disposed at the upper side of the multilayer reflector 204. The input coupling element 206 and the output coupling element 208 are used to change the direction of at least some of the light entering the coupling elements 206, 208, so as to couple light through the controlled transmission mirror 200. Exemplary embodiments of input coupling elements 206 and output coupling elements 208 include diffusers, both surface and bulk diffusers, and microreplicated surfaces. Examples of input coupling elements 206 and output coupling elements 208 are described in greater detail below. The output coupling element 208 may be the same type of coupling element as the input coupling element 206, for example, the input and output coupling element 206, 208 may both be bulk diffusers, or the output coupling element 208 may be different from the input coupling element 206. The input and output coupling elements 206, 208 may be laminated or otherwise formed integrally with the multilayer reflector 204.

The multilayer reflector 204 is generally constructed of optical repeating units that form the basic building blocks of a dielectric stack. The optical repeating units typically include two or more layers of at least a high and a low refractive index material. A multilayer reflector can be designed, using these building blocks, to reflect infrared, visible or ultraviolet wavelengths and one or both of a given orthogonal pair of polarizations of light. In general, the stack can be constructed to reflect light of a particular wavelength, $\lambda$, by controlling the optical thickness of the layers according to the relationship:

$$\lambda = (2/M)*D_r,\qquad(1)$$

where M is an integer representing the order of the reflected light, and $D_r$ is the optical thickness of an optical repeating unit. For the first order reflection (M=1), the optical repeating unit has an optical thickness of $\lambda/2$. Simple quarter-wave stacks comprise a number of layers that each have an optical thickness of one quarter of the wavelength, $\lambda/4$. Broadband reflectors can include multiple quarter-wave stacks tuned to various wavelengths, a stack with a continuous gradation of the layer thickness throughout the stack, or combinations thereof. A multilayer reflector may further include non-optical layers. For example, a coextruded polymeric dielectric reflector may include protective boundary layers and/or skin layers used to facilitate formation of the reflector film and to protect the reflector. Polymeric optical stacks particularly suited to the present invention are described in published PCT Patent Application WO 95/17303, entitled Multilayer Optical Film and U.S. Pat. No. 6,531,230, incorporated herein by reference. In other embodiments, the dielectric stack may be a stack of inorganic materials. Some suitable materials used for the low refractive index material include $SiO_2$, $MgF_2$, $CaF_2$ and the like. Some suitable materials used for the high refractive index material include $TiO_2$, $Ta_2O_5$, $ZnSe$ and the like. The invention is not limited to quarter-wave stacks, however, and is more generally applicable to any dielectric stack including, for example, computer optimized stacks and random layer thickness stacks.

Reflection by a dielectric stack of light at a particular wavelength is dependent, in part, on the propagation angle through the stack. The multilayer reflector 204 may be considered as having a reflection band profile (e.g., band center and bandedges) for light propagating in the stack at a particular angle. This band profile changes as the angle of propagation in the stack changes. The propagation angle in the stack is generally a function of the incident angle and the refractive indices of the materials in the stack and the surrounding medium. The wavelength of the bandedge of the reflection band profile changes as the propagation angle in the stack changes. Typically, for the polymeric materials under consideration, the bandedge of the reflector for light at normal incidence shifts to about 80% of its normal incidence value when viewed at grazing incidence in air. This effect is described in greater detail in U.S. Pat. No. 6,208,466, incorporated herein by reference. The bandedge shift may shift considerably further when the light is coupled into the reflector using a medium having a refractive index higher than air. Also, the shift in the bandedge is typically greater for p-polarization light than for s-polarization light.

The angular dependence of the reflection band profile, e.g., bandedge shifting with angle, results from a change in the effective layer thickness. The reflection band shifts towards shorter wavelengths as the angle increases from normal incidence. While the total path length through a given layer increases with angle, the change in band position with angle does not depend on the change in the total path length through a layer with angle, $\theta$, where the angle is measured relative to an axis 230 perpendicular to the layers of the reflector 204. Rather, the band position depends on the difference in path length between light rays reflected from the top and bottom surfaces of a given layer. This path difference decreases with angle of incidence as shown by the familiar formula n.d.cos θ=λ, the wavelength to which a given layer is tuned as a λ/4 thick layer. In the expression, n is the refractive index of the layer material and d is the thickness of the layer.

The above description describes how the bandedge of the reflection band profile changes as a function of angle. As used herein, the term bandedge generally refers to the region where the multilayer reflector changes from substantial reflection to substantial transmission. This region may be fairly sharp and described as a single wavelength. In other cases, the transition between reflection and transmission may be more gradual and may be described in terms of a center wavelength and bandwidth. In either case, however, a substantial difference between reflection and transmission exists on either side of the bandedge.

As light at the particular wavelength propagates in the stack at increasing propagation angles (measured from the axis 230 normal to the interface of the repeating units), the light approaches the bandedge. In one example, at high enough propagation angles, the stack will become substantially transparent to that particular wavelength of light and the light will transmit through the stack. Thus, for a given wavelength of light, the stack has an associated propagation angle below which the stack substantially reflects the light and another propagation angle, above which the stack substantially transmits the light. Accordingly, in certain multilayer stacks, each wavelength of light may be considered as having a corresponding angle below which substantial reflection occurs and a corresponding angle above which substantial transmission occurs. The sharper the bandedge, the closer these two angles are for the associated wavelength. For the purposes of the present description, the approximation is made that these two angles are the same and have a value of $\theta_{min}$.

The above description describes the manner in which monochromatic light in a given stack shifts from reflection to transmission with increasing angle of propagation. If the stack is illuminated with light having a mixture of components at different wavelengths, the angle, $\theta_{min}$, at which the reflective stack changes from being reflective to transmissive is likely to be different for the different wavelength components. Since the bandedge moves to shorter wavelengths with increasing angle, the value of $\theta_{min}$ is lower for light at longer wavelengths, potentially allowing more light at longer wavelengths to be transmitted through the multilayer reflector than at shorter wavelengths. In some embodiments it may be desired that the color of the light passing out of the controlled transmission mirror be relatively uniform. One approach to balancing the color is to use an input and output coupling element that couples more light at shorter wavelengths than at longer wavelengths into the controlled transmission mirror.

One example of such a coupling element is a bulk diffuser that contains scattering particles dispersed within a polymer matrix, as is discussed below with regards to FIGS. 3A and 4A. The scattering particles have a refractive index different from the surrounding matrix. The nature of diffusive scattering is that, all else being equal, light at shorter wavelengths is scattered more than light at longer wavelengths.

In addition, the degree of scattering is dependent on the difference between the refractive indices of the particles and the surrounding matrix. If the difference in refractive index is greater at shorter wavelengths, then even more short wavelength light is scattered. In one particular embodiment of a diffusive coupling element, the matrix is formed of biaxially stretched PEN, which has an in-plane refractive index of about 1.75 for red light and about 1.85 for blue light, where the light is s-polarized, i.e., has high dispersion. The in-plane refractive index is the refractive index for light whose electric vector is polarized parallel to the plane of the film. The out-of-plane refractive index, for light polarized parallel to the thickness direction of the film, is about 1.5 The refractive index for p-polarized light is lower than that of the s-polarized light, since the p-polarized light experiences an effective refractive index that is a combination of the in-plane refractive index and the out-of-plane refractive index.

The particles in the matrix may have a high refractive index, for example titanium dioxide particles have a refractive index of about 2.5. The refractive index of $TiO_2$ varies by approximately 0.25 over the range 450 nm-650 nm, which is greater than the approximately 0.1 variation for PEN over a similar wavelength range. Thus, the refractive index difference between the particles and the matrix changes by about 0.15 across the visible spectrum, resulting in increased scattering for the blue light. Consequently, the refractive index difference between the particles and the matrix can vary significantly over the visible spectrum.

Thus, due to the wavelength dependence of the diffusive scattering mechanism and the large difference in the refractive index difference over the visible spectrum, the degree to which blue light is scattered into the multilayer reflector is relatively high, which at least partially compensates for the larger value of $\theta_{min}$, at shorter wavelengths.

Other embodiments of input and output coupling elements, for example those described below with reference to FIGS. 3B-3D and 4B-4D, rely primarily on refractive effects for diverting the light. For example, a coupling element may be provided with a surface structure or holographic features for coupling the light into or out of the multilayer reflector. Normal material dispersion results in greater refractive effects for shorter wavelengths. Therefore, input and output coupling elements that rely on refractive effects may also at least partially compensate for the larger value of $\theta_{min}$, at shorter wavelengths.

Understanding, therefore, that the light entering the controlled transmission mirror may have a wide variation in the value of $\theta_{min}$, the following description refers to only a single value of $\theta_{min}$, for simplicity.

Another effect that the system designer can use to control the amount of light passing through the multilayer reflector is the selection of a Brewster's angle, the angle at which p-polarized light passes through the multilayer reflector without reflective loss. For adjacent isotropic layers 1 and 2 in the multilayer reflector, having refractive indices n1 and n2 respectively, the value of Brewster's angle in layer 1, $\theta_B$, for light passing from layer 1 to layer 2, is given by the expression tan $\theta_B$=n2/n1. Thus, the particular materials employed in the different layers of the multilayer reflector may be selected to provide a desired value of Brewster's angle.

The existence of the Brewster's angle for a multilayer reflector provides another mechanism for allowing light to pass through the reflector other than relying on the input and output coupling layers to divert the light through large angles. As the angle within the controlled transmission mirror is increased for p-polarized light, the reflection band substantially disappears at Brewster's angle. At angles above the Brewster's angle, the reflection band reappears and continues to shift to shorter wavelengths.

In certain embodiments, it may be possible to set the value of $\theta_B$ for blue light to be less than $\theta_{min}$, but have $\theta_B$ be greater than $\theta_{min}$ for red light. This configuration may lead to an increased transmission for blue light through the multilayer reflector, which compensates at least in part for the higher value of $\theta_{min}$ for shorter wavelength light.

At least some of the light from the light source 116a propagates towards the controlled transmission mirror 200. A portion of the light, exemplified by light ray 210, passes through the input coupling element 206 and is incident on the multilayer reflector 204 at an angle greater than $\theta_{min}$ and is transmitted through the reflector 204. Another portion of the light, exemplified by light ray 212, is incident at the input coupling element 206 at an angle less than $\theta_{min}$, but is diverted by the input coupling element 206 to an angle of at least $\theta_{min}$, and is transmitted through the multilayer reflector 204. Another portion of light from the light source 116a, exemplified by light ray 214, passes through the input coupling element 206 and is incident at the multilayer reflector 204 at an angle that is less than $\theta_{min}$. Consequently, light 214 is reflected by the multilayer reflector 204 to the reflecting surface 202. The light 214 may be reflected at the reflecting surface 202 either specularly or diffusely.

In some embodiments it may be desired that the multilayer reflector 204 is attached to the output coupling element 208 in a manner that avoids a layer of air, or some other material of a relatively low refractive index, between the multilayer reflector 204 and output coupling element 208. Such close optical coupling between the multilayer reflector 204 and the output coupling element 208 reduces the possibility of total internal reflection of light at the multilayer reflector 204.

The maximum angle of the light within the controlled transmission mirror, $\theta_{max}$, is determined by the relative refractive indices of the input coupling element 206, $n_i$, and the refractive index of the particular layer of the multilayer reflector 204, $n_1$, $n_2$, where the subscripts 1, 2 refer to the alternating layers in the multilayer reflector 204. Where the input coupling element 206 is a surface coupling element, the value of $n_i$ is equal to the refractive index of the material on which the coupling surface is formed. Propagation from the input coupling element 206 into the multilayer reflector 204 is subject to Snell's law. The value of $\theta_{max}$ in each alternate layer of the multilayer reflector 204 is given by the expression:

$$\theta_{max} = \sin^{-1}(n_i/n_{1,2}). \qquad (2)$$

where either $n_1$ or $n_2$ is used. Where $n_i > n_1$ and $n_i > n_2$, then $\theta_{max}$ can be up to 90°.

The output coupling element 208 is used to extract at least some of the light out of the illumination light unit 199. For example, some of light 212 may be diffused by the output coupling element 208 so as to pass out of the controlled transmission mirror 120 as light 220.

Other portions of the light, for example ray 222, may not be diverted by the output coupling element 208. If light 222 is incident at the upper surface of the output coupling element 208 at an angle greater than the critical angle of the output coupling element, $\theta_c = \sin^{-1}(1/n_0)$, where no is the refractive index of the output coupling element 208 and the output coupling element 208 is interfaced with air, then the light 222 is totally internally reflected within the output coupling element 208 as light 224. The reflected light 224 may subsequently be totally internally reflected at the lower surface of the input coupling element 206. Alternatively, the light 224 may subsequently be diverted by the input coupling element 206 and pass out of the controlled transmission mirror 200 towards the reflecting surface 202.

If the light that passes into the multilayer reflector 204 with an angle of at least $\theta_{min}$ is incident at the output coupling element 208 with an angle greater than $\theta_c$, then that light which is not diverted out of the output coupling element 208 is typically totally internally reflected within the output coupling element 208. If, however, the light that passes into the multilayer reflector 204 with an angle of at least $\theta_{min}$ reaches the output coupling element 208 at a propagation angle less than $\theta_c$ then a fraction of that light may be transmitted out through the output coupling element 208, even without being diverted by the output coupling element 208, subject to Fresnel reflection loss at the interface between the output coupling element 208 and the air. Thus, there are many possibilities for the light to suffer multiple reflections and for its direction to be diverted within the reflecting cavity 118. The light may also propagate transversely within the space between the controlled transmission mirror 200 and the reflecting surface 202. These multiple effects combine to increase the likelihood that the light is spread laterally and extracted with to produce a backlight illuminance of more uniform brightness.

Except for the possibility that the multilayer reflector 204 has a value of Brewster's angle, $\theta_B$, that is lower than $\theta_{min}$, there is a forbidden angular region for light originating at the light source 116a. This forbidden angular region has a half-angle of $\theta_{min}$, and is located above the light source 116a. Light cannot pass through the multilayer reflector 204 within the forbidden angular region. Light 232 from neighboring light sources 116, for example light source 116b, however, may be able to escape from the controlled transmission mirror 200 at a point perpendicularly above light source 116a, at the axis 230, and so the illumination light unit 199 is effective at mixing light from different light sources 116a, 116b.

In view of the description of the controlled transmission mirror 200 provided above, it can be seen that the function of the input coupling element 206 is to divert at least some light, that would otherwise be incident at the multilayer reflector 204 at an angle less than $\theta_{min}$, so as to be incident at the multilayer reflector 204 at an angle of at least $\theta_{min}$. Also, the function of the output coupling element 208 is to divert at least some light, that would otherwise be totally internally reflected within the controlled transmission mirror 200, so as to pass out of the controlled transmission mirror 200.

Figure 2B:
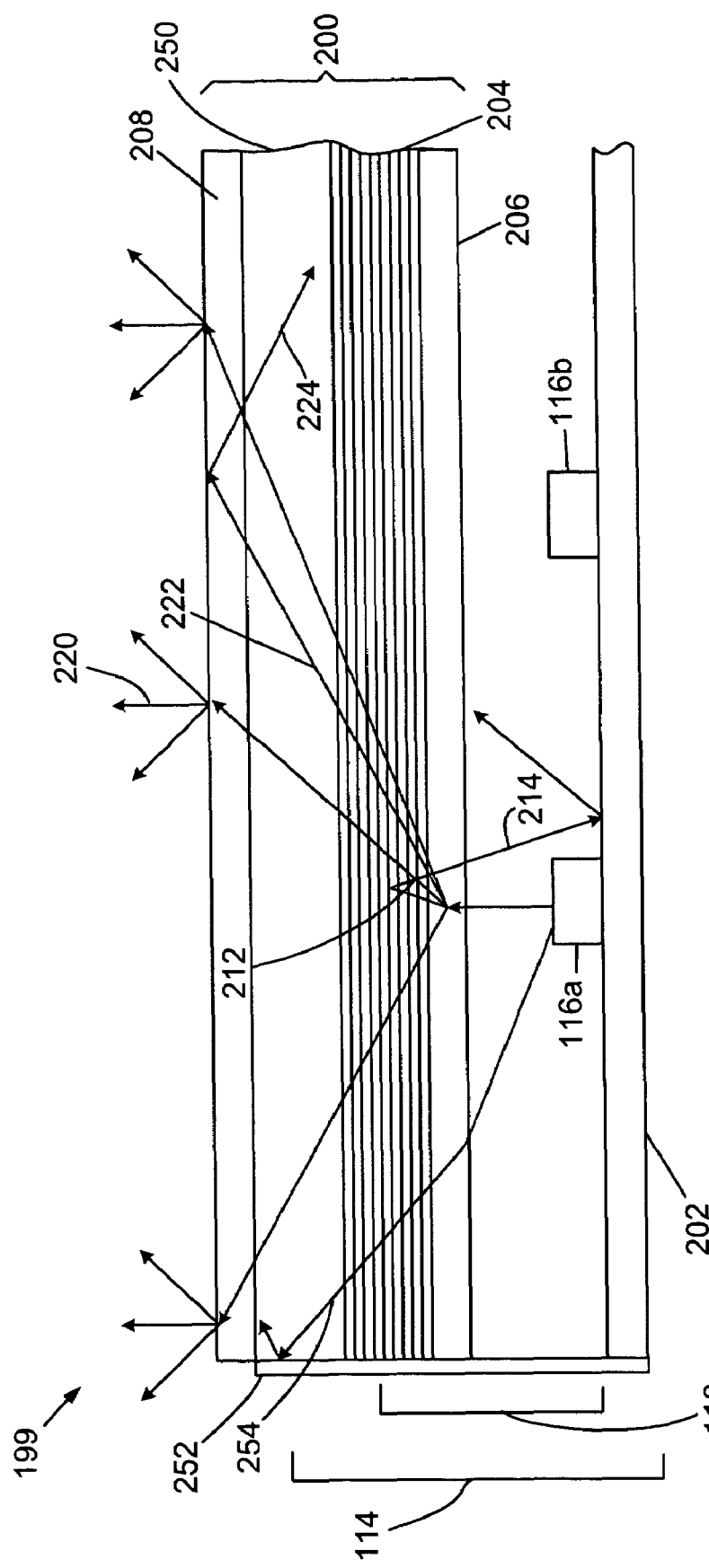

Another exemplary embodiment of a controlled transmission mirror 200 is schematically illustrated in FIG. 2B, in which a transparent layer 250 is disposed between the multilayer reflector 204 and the output coupling element 208. The transparent layer 250 may be formed of any suitable transparent material, organic or inorganic, for example polymer or glass. Suitable polymer materials may be amorphous or semi-crystalline, and may include homopolymer, copolymer or blends thereof. Example polymer materials include, but are not limited to, amorphous polymers such as poly(carbonate) (PC); poly(styrene) (PS); acrylates, for example acrylic sheets as supplied under the ACRYLITE® brand by Cyro Industries, Rockaway, N.J.; acrylic copolymers such as isooctyl acrylate/acrylic acid; poly(methylmethacrylate) (PMMA); PMMA copolymers; cycloolefins; cylcoolefin copolymers; acrylonitrile butadiene styrene (ABS); styrene acrylonitrile copolymers (SAN); epoxies; poly(vinylcyclohexane); PMMA/poly(vinylfluoride) blends; atactic poly(propylene); poly(phenylene oxide) alloys; styrenic block copolymers; polyimide; polysulfone;

poly(vinyl chloride); poly(dimethyl siloxane) (PDMS); polyurethanes; and semicrystalline polymers such as poly (ethylene); poly(propylene); poly(ethylene terephthalate) (PET); poly(carbonate)/aliphatic PET blends; poly(ethylene naphthalate)(PEN); polyamides; ionomers; vinyl acetate/ polyethylene copolymers; cellulose acetate; cellulose acetate butyrate; fluoropolymers; poly(styrene)-poly(ethylene) copolymers; PET and PEN copolymers, and clear fiberglass panels. Some of these materials, for example PET, PEN and copolymers thereof, may be oriented so as to change the material refractive index from that of the isotropic material. The transparent layer 250 may be used to allow more lateral spreading of the light from the light sources 116*a*, 116*b* before extracting the light from the controlled transmission mirror 200 using the output coupling element 208.

One or more of the edges of the transparent layer 250 may be covered by a reflector 252. Thus, light 254 that might otherwise escape from the transparent layer 250 is reflected back into the transparent layer 250 and may be extracted from the illumination light unit 199 as useful illumination light. The reflector 256 may be any suitable type of reflector, including a multilayer dielectric reflector, a metal coating on the edge of the transparent layer 250, a multilayer polymer reflector, a diffuse polymer reflector, or the like. In the illustrated embodiment, the reflector 252 at the side of the transparent layer 250 may be also used as a side reflector for the reflecting cavity 114, although this is not intended to be a limitation of the invention.

Figure 2C:
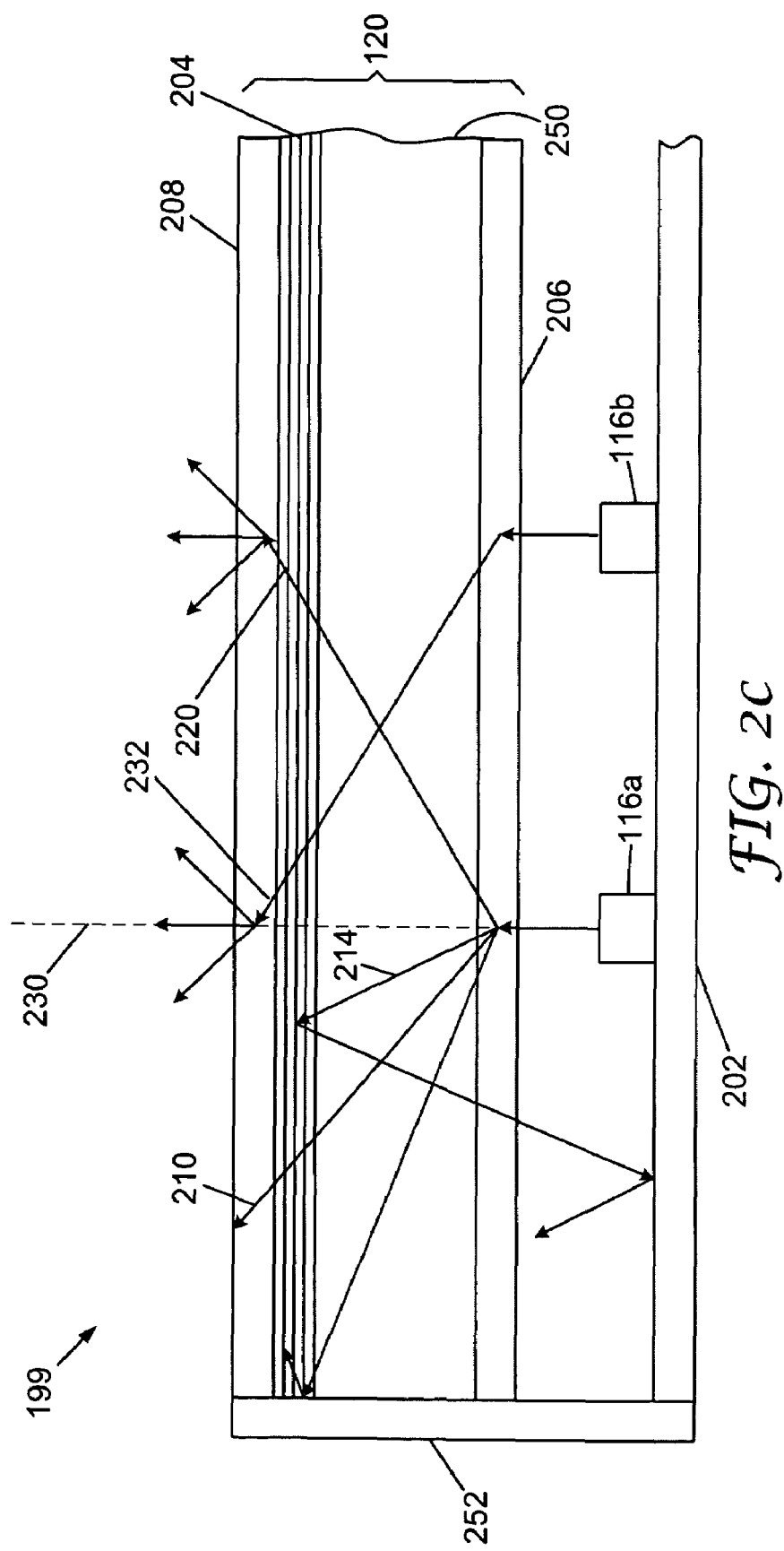

In another exemplary embodiment, schematically illustrated in FIG. 2C, the transparent layer 250 is disposed between the input coupling element 206 and the multilayer reflector 204.

Figure 2D:
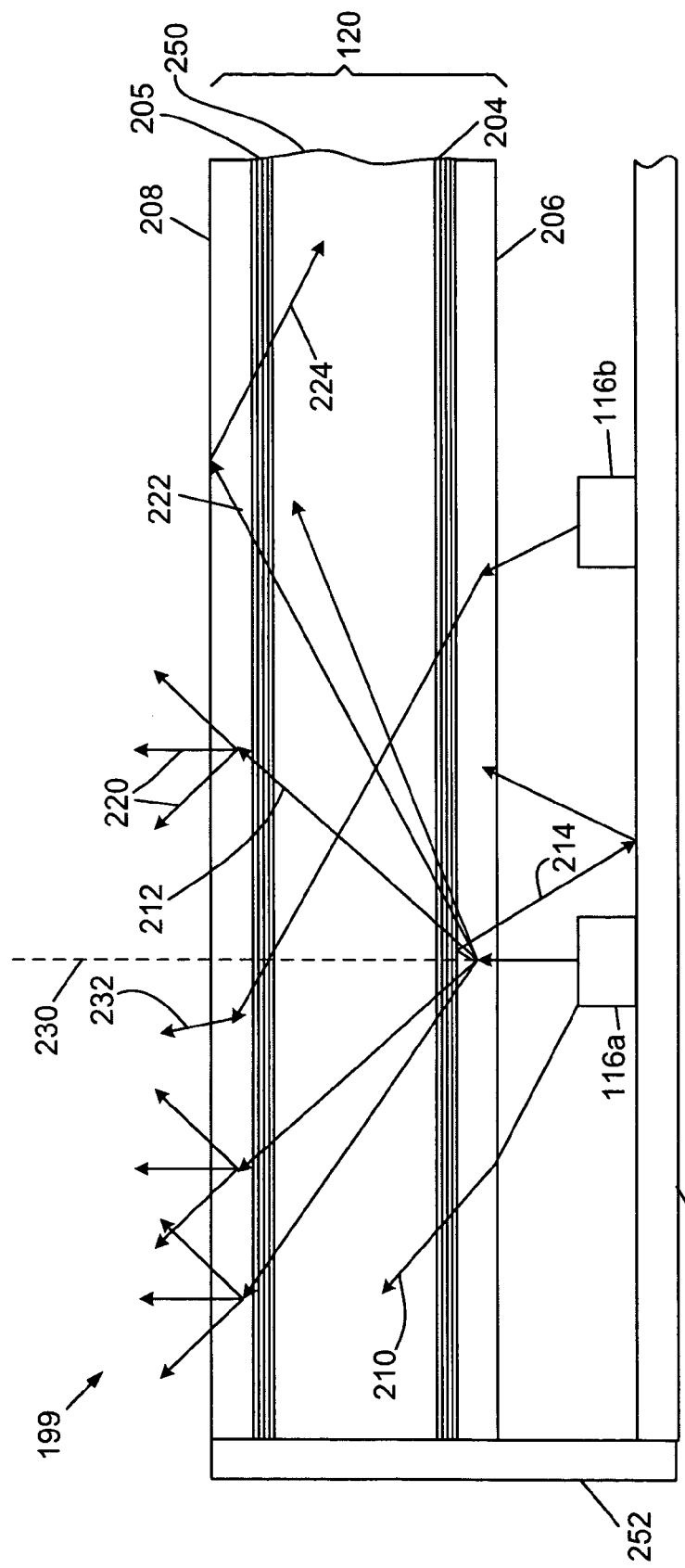

In some other embodiments, the controlled transmission mirror 200 may be provided with two multilayer reflectors 204, 205 positioned on either side of the transparent layer 250, as is schematically illustrated in FIG. 2D. The multilayer reflectors 204, 205 may have the same value of $\theta_{min}$, although this is not required.

The use of a transparent layer is described further in U.S. patent application Ser. No. 11/166,723, titled "OPTICAL ELEMENT FOR LATERAL LIGHT SPREADING IN BACK-LIT DISPLAYS AND SYSTEM USING SAME" filed on even date herewith, incorporated herein by reference.

Exemplary embodiments of different types of input coupling elements are now discussed with reference to FIGS. 3A-3D. In other exemplary embodiments, not illustrated, a transparent layer may be provided between the multilayer reflector and either of the input and output coupling elements.

Figure 3A:
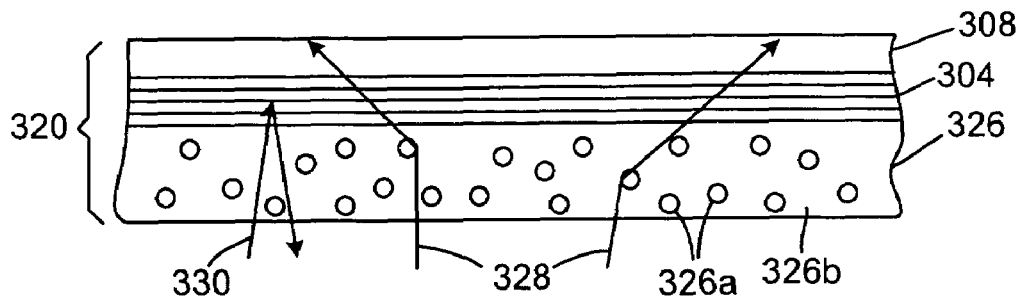
FIGS. 3A-3D schematically illustrate partial cross-sectional views of different embodiments of input coupling elements for a controlled transmission mirror, according to principles of the present invention.
Figure 4A:
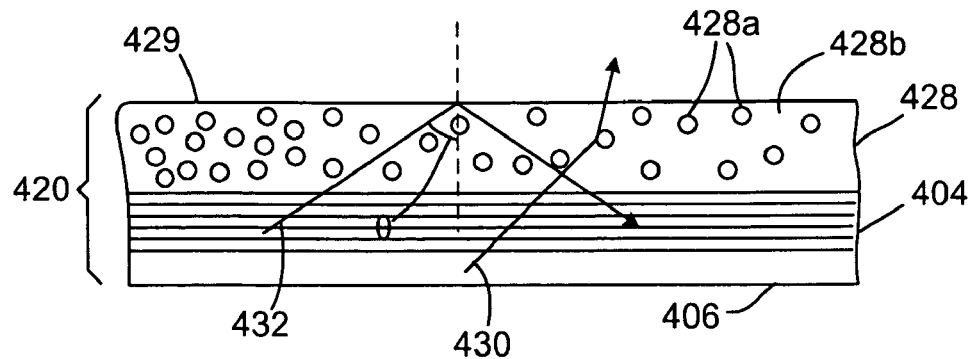
FIGS. 4A-4D schematically illustrate cross-sectional views of different embodiments of output coupling elements for a controlled transmission mirror according to principles of the present invention.

In FIG. 3A, an exemplary embodiment of a controlled transmission mirror 320 comprises an input coupling element 326, a multilayer reflector 304 and an output coupling element 308. In this particular embodiment, the input coupling element 326 is a bulk diffusing layer, comprising diffusing particles 326*a* dispersed within a transparent matrix 326*b*. At least some of the light entering the input coupling element 326 at an angle less than $\theta_{min}$, for example light rays 328, is scattered within the input coupling element 326 at an angle greater than $\theta_{min}$, and is consequently transmitted through the multilayer reflector 304. Some light, for example ray 330, may not be scattered within the input coupling element 326 through a sufficient angle to pass through the multilayer reflector 304, and is reflected by the multilayer reflector 304. Suitable materials for the transparent matrix 326*b* include, but are not limited to, polymers such as those listed as being suitable for use in a transparent layer above.

The diffusing particles 326*a* may be any type of particle useful for diffusing light, for example transparent particles whose refractive index is different from the surrounding polymer matrix, diffusely reflective particles, or voids or bubbles in the matrix 326*b*. Examples of suitable transparent particles include solid or hollow inorganic particles, for example glass beads or glass shells, solid or hollow polymeric particles, for example solid polymeric spheres or polymeric hollow shells. Examples of suitable diffusely reflecting particles include particles of titanium dioxide ($TiO_2$), calcium carbonate ($CaCO_3$), barium sulphate ($BaSO_4$), magnesium sulphate ($MgSO_4$) and the like. In addition, voids in the matrix 426*b* may be used for diffusing the light. Such voids may be filled with a gas, for example air or carbon dioxide.

Figure 3B:
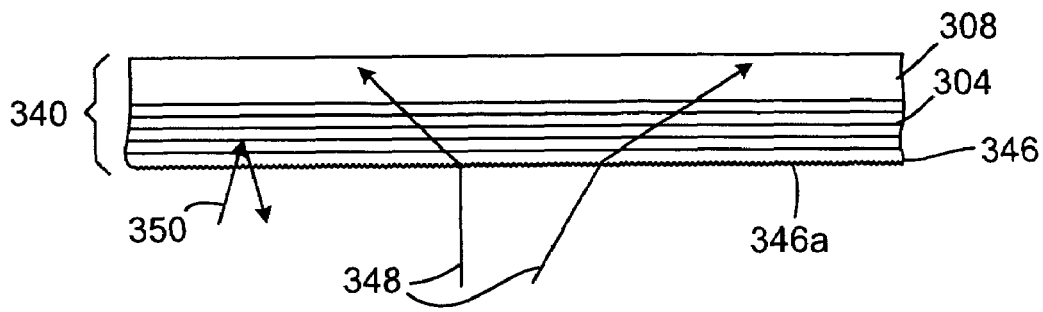

Another exemplary embodiment of a controlled transmission mirror 340 is schematically illustrated in FIG. 3B, in which the input coupling element 346 comprises a surface diffuser 346*a*. The surface diffuser 346*a* may be provided on the bottom layer of the multilayer reflector 304 or on a separate layer attached to the multilayer reflector 304. The surface diffuser 346*a* may be molded, impressed, cast or otherwise prepared.

At least some of the light incident at the input coupling element 346, for example light rays 348, is scattered by the surface diffuser 346*a* to propagate an angle greater than $\theta_{min}$, and is consequently transmitted through the multilayer reflector 304. Some light, for example ray 350, may not be scattered by the surface diffuser 346*a* through a sufficient angle to pass through the multilayer reflector 304, and is reflected.

Figure 3C:
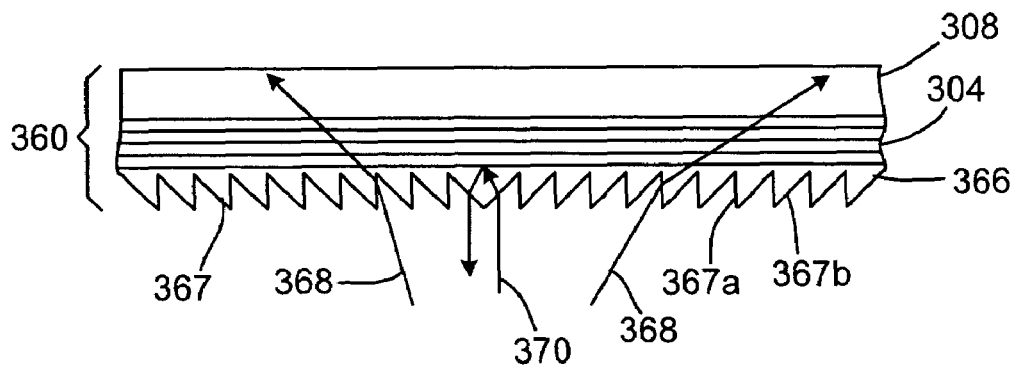

Another exemplary embodiment of a controlled transmission mirror unit 360 is schematically illustrated in FIG. 3C, in which the input coupling element 366 comprises a microreplicated structure 367 having facets 367*a* and 367*b*. The structure 367 may be provided on the bottom layer of the multilayer reflector 304 or on a separate layer attached to the multilayer reflector 304. The structure 367 is different from the surface diffuser 346*a* of FIG. 3B in that the surface diffuser 346*a* includes a mostly random surface structure, whereas the structure 367 includes more regular structures with defined facets 367*a*, 367*b*.

At least some of the light incident at the input coupling element 366, for example rays 368 incident on facets 367*a*, would not reach the multilayer reflector 304 at an angle of $\theta_{min}$ but for refraction at the facet 367*a*. Accordingly, light rays 368 are transmitted through the multilayer reflector 304. Some light, for example ray 370, may be refracted by facet 367*b* to an angle less than $\theta_{min}$, and is, therefore, reflected by the multilayer reflector 304.

Figure 3D:
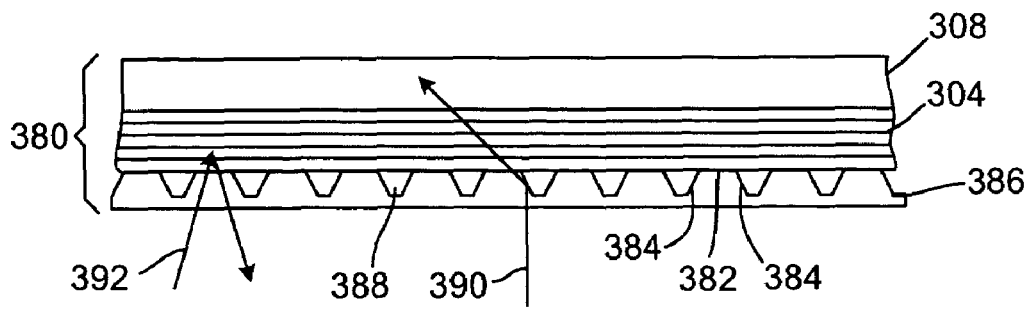

Another exemplary embodiment of a controlled transmission mirror 380 is schematically illustrated in FIG. 3D, in which the input coupling element 386 has surface portions 382 in optical contact with the multilayer reflector 304 and other surface portions 384 that do not make optical contact with the multilayer reflector 304, with a gap 388 being formed between the element 386 and the multilayer reflector 304. The presence of the gap 388 provides for total internal reflection (TIR) of some of the incident light. This type of coupling element may be referred to as a TIR input coupling element.

At least some of the light incident at the input coupling element 386, for example rays 390 incident on the non-contacting surface portions 384 would not reach the multilayer reflector 304 at an angle of θ$_{min}$ but for internal reflection at the surface 384. Accordingly, light rays 390 may be transmitted through the multilayer reflector 304. Some light, for example ray 392, may be transmitted through the contacting surface portion 382 to the multilayer reflector 304 and is incident at the multilayer reflector 302 at an angle less than θ$_{min}$. The light 392 is reflected by the multilayer reflector 304.

Other types of TIR coupling elements are described in greater detail in U.S. Pat. No. 5,995,690, incorporated herein by reference.

Other types of input coupling elements may be used in addition to those described in detail here, for example input coupling elements that include a surface or a volume hologram. Also, an input coupling element may combine different approaches for diverting light. For example, an input coupling element may combine a surface treatment, such as a surface structure or surface scattering pattern or surface hologram, with bulk diffusing particles.

It may be desired in some embodiments for the refractive index of the input coupling element and output coupling element to have a relatively high refractive index, for example comparable to or higher than the effective refractive index (the average of the refractive indices of the high index and low index layers) of the multilayer reflector 304. A higher refractive index for the input and output coupling elements helps to increase the angle at which light may propagate through the multilayer reflector 304, which leads to a greater bandedge shift. This, in turn, may increase the amount of short wavelength light that passes through the controlled transmission mirror, thus making the color of the backlight illumination more uniform. Examples of suitable high refractive index polymer materials that may be used for input and output coupling elements include biaxially stretched PEN and PET which, depending on the amount of stretch, can have in-plane refractive index values of 1.75 and 1.65 respectively for a wavelength of 633 nm.

Commensurate with the choice of materials for the input and output coupling elements, the substrate should be chosen to have an index that does not cause TIR that would block prohibitive amounts of light entering or exiting at large angles. Conversely, a low index for the substrate would result in high angles of propagation in the substrate after injection from the input coupler having a higher index than the substrate. These two effects can be chosen to optimize the performance of the system with respect to color balance and lateral spreading of the light.

Similar approaches may be used for the output coupling element. For example, a controlled transmission mirror unit 420 is schematically illustrated in FIG. 4A to have an input coupling element 406, a multilayer reflector 404 and an output coupling element 428. In this particular embodiment, the output coupling element 428 is a bulk diffusing layer, comprising diffusing particles 428a dispersed within a transparent matrix 428b. Suitable materials for use as the diffusing particles 428a and the matrix 428b are discussed above with respect to the input coupling element 326 of FIG. 3A.

At least some of the light entering the output coupling element 428 from the multilayer reflector 404, for example light ray 430, may be scattered by the diffusing particles 428a in the output coupling element 408 and is consequently transmitted out of the light output coupling element 428. Some light, for example ray 432, may not be scattered within the output coupling element 428 and is incident at the top surface 429 of the output coupling element 428 at an incident angle of θ. If the value of θ is equal to or greater than the critical angle, θ$_c$, for the material of the matrix 428b, then the light 432 is totally internally reflected at the surface 429.

Figure 4B:
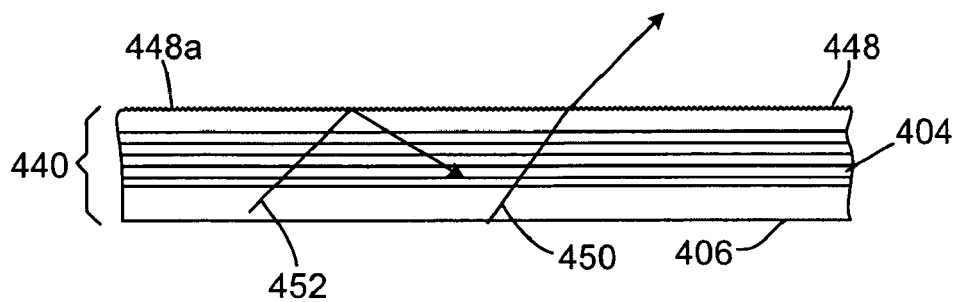

Another exemplary embodiment of controlled transmission reflector 440 is schematically illustrated in FIG. 4B, in which the output coupling element 448 comprises a surface diffuser 448a. The surface diffuser 448a may be provided on the upper surface of the multilayer reflector 404 or on a separate layer attached to the multilayer reflector 404.

Some light propagating within the multilayer reflector 404, for example light 450, is incident at the surface diffuser 448a and is scattered out of the light mixing layer 440. Some other light, for example light 452, may not be scattered by the surface diffuser 448a. Depending on the angle of incidence at the surface diffuser 448a, the light 452 may be totally internally reflected, as illustrated, or some light may be transmitted out of the controlled transmission mirror 440 while some is reflected back within the multilayer reflector 404.

Figure 4C:
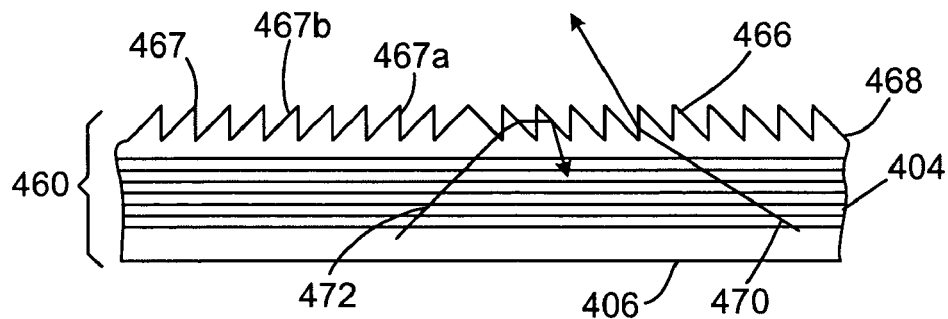

Another exemplary embodiment of controlled transmission mirror 460 is schematically illustrated in FIG. 4C, in which the output coupling element 466 comprises a microreplicated structure 467 having facets 467a and 467b. The structure 467 may be provided on a separate layer 468 attached to the multilayer reflector 404, as illustrated, or be integral with the top surface of the multilayer reflector 404 itself. The structure 467 is different from the surface diffuser 448a in that the surface diffuser includes a mostly random surface structure, whereas the structure 467 includes more regular structures with defined facets 467a, 467b.

Some light propagating within the multilayer reflector 404, for example light 470, is incident at the surface diffuser structure 467 and is refracted out of the controlled transmission mirror 460. Some other light, for example light 472, may not be refracted out of the controlled transmission mirror 460 by the structure 467, but may be returned to the multilayer reflector 404. The particular range of propagation angles for light to escape from the controlled transmission mirror 460 is dependent on a number of factors, including at least the refractive indices of the different layers that make up the controlled transmission mirror 460 and the layer 468, as well as the shape of the structure 467.

Figure 4D:
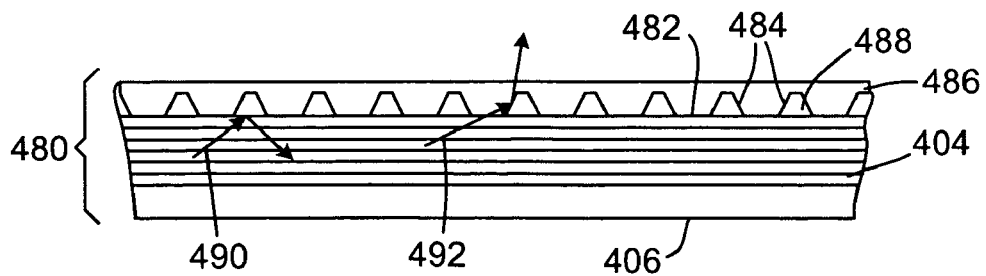

Another exemplary embodiment of a controlled transmission mirror 480 is schematically illustrated in FIG. 4D, in which the output coupling element 486 comprises a light coupling tape that has surface portions 482 in optical contact with the multilayer reflector 404 and other surface portions 484 that do not make optical contact with the multilayer reflector 404, forming a gap 488 between the element 486 and the multilayer reflector 404.

At least some of the light incident at the output coupling element 486, for example light ray 490, is incident at a portion of the multilayer reflector's surface that is not contacted to the output coupling element 486, but is adjacent to a gap 488, and so the light 490 is totally internally reflected. Some light, for example ray 492, may be transmitted through the contacting surface portion 482, and be totally internally reflected at the non-contacting surface portion 484, and so is coupled out of the controlled transmission mirror 480.

Other types of output coupling elements may be used in addition to those described in detail here. Also, an output coupling element may combine different approaches for diverting light out of the controlled transmission mirror. For example, an output coupling element may combine a surface treatment, such as a surface structure or surface scattering pattern, with bulk diffusing particles.

In some embodiments, the output coupling element may be constructed so that the degree to which light is extracted is uniform across the output coupling element. In other embodiments, the output coupling element may be constructed so that the degree to which light is extracted out of the controlled transmission mirror is not uniform across the output coupling element. For example, in the embodiment of output coupling element 428 illustrated in FIG. 4A, the density of diffusing particles 428a may be varied across the output coupling element 428 so that a higher fraction of light can be extracted from some portions of the output coupling element 428 than others. In the illustrated embodiment, the density of diffusing particles 428a is higher at the left side of the output coupling element 428. Likewise, for the embodiments of controlled transmission mirror 440, 460, 480 illustrated in FIGS. 4B-4D, the output coupling elements 448, 468, 488 may be shaped or designed so that a higher fraction of light can be extracted from some portions of the output coupling elements 448, 468, 488 than from other portions. The provision of non-uniformity in the extraction of the light from the controlled transmission mirror, for example extracting a smaller fraction of light from portions of the controlled transmission mirror that contain more light and extracting a higher fraction of light from portions of the controlled transmission mirror that contain less light, may result in a more uniform brightness profile in the illumination light propagating towards the display panel.

The number of bounces made by light within the controlled transmission mirror, and therefore, the uniformity of the extracted light, may be affected by the reflectivity of both the input coupling element and the output coupling element. The trade-off for uniformity is brightness loss caused by absorption in the input coupling element, the multilayer reflector and the output coupling element. This absorption loss may be reduced by proper choice of materials and material processing conditions.

Figure 5A:
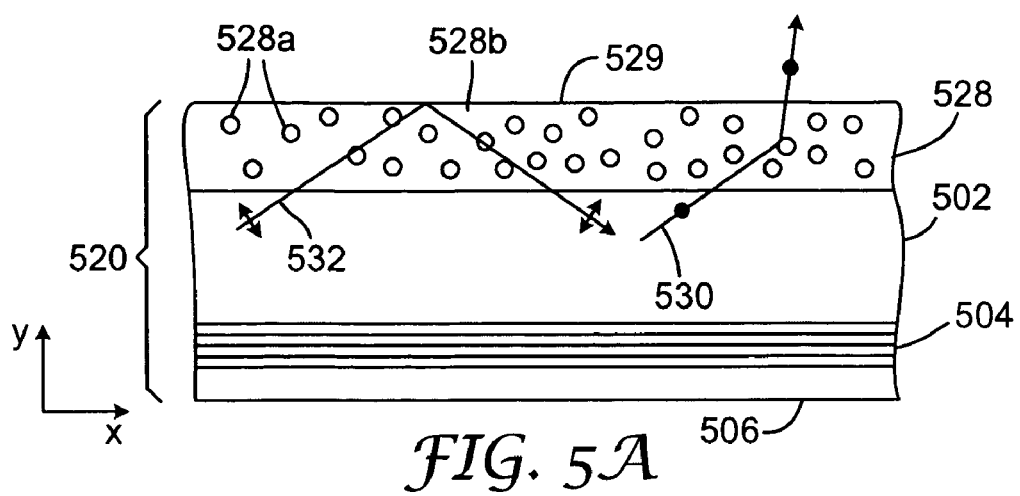
FIG. 5A schematically illustrates a cross-sectional view of an embodiment of a polarization sensitive controlled transmission mirror according to principles of the present invention.

In some exemplary embodiments, the controlled transmission mirror may be polarization sensitive, so that light in one polarization state is preferentially extracted. A cross-section through one exemplary embodiment of a polarization sensitive controlled transmission mirror 520 is schematically illustrated in FIG. 5A. The controlled transmission mirror 520 comprises an optional transparent layer 502, a multilayer reflector 504, an input coupling element 506 and a polarization sensitive output coupling element 528. A three-dimensional coordinate system is used here to clarify the following description. The axes of the coordinate system have been arbitrarily assigned so that the plane of the controlled transmission mirror 520 lies parallel to the x-y plane, with the z-axis having a direction through the thickness of the controlled transmission mirror 520. The lateral dimension shown in FIG. 5A is parallel to the x-axis, and the y-direction extends in a direction perpendicular to the drawing.

In some embodiments, the extraction of only one polarization of the light propagating within the controlled transmission mirror 520 is effected by the output coupling element 528 containing two materials, for example different polymer phases, at least one of which is birefringent. In the illustrated exemplary embodiment, the output coupling element 528 has scattering elements 528a, formed of a first material, embedded within a continuous matrix 528b formed of a second material. The refractive indices for the two materials are substantially matched for light in one polarization state and remain unmatched for light in an orthogonal polarization state. Either or both of the scattering elements 528a and the matrix 528b may be birefringent.

If, for example, the refractive indices are substantially matched for light polarized in the x-z plane, and the refractive indices of the first and second materials are $n_1$ and $n_2$ respectively, the condition holds that $n_{1x} \approx n_{1z} \approx n_{2x} \approx n_{2z}$, where the subscripts x and z denote the refractive indices for light polarized parallel to the x and z axes respectively. If $n_{1y} \neq n_{2y}$, then light polarized parallel to the y-axis, for example light 530, may be scattered within the output coupling element 528 and pass out of the controlled transmission mirror 520. The orthogonally polarized light, for example light ray 532, polarized in the x-z plane, remains substantially unscattered on passing within the output coupling element 528 because the refractive indices for this polarization state are matched. Consequently, if the light 532 is incident on the top surface 529 of the output coupling element 528 at an angle equal to, or greater than, the critical angle, $\theta_c$, of the continuous phase 528b, the light 532 is totally internally reflected at the surface 529, as illustrated.

To ensure that the light extracted from the output coupling element 528 is well polarized, the matched refractive indices may be preferably matched to within at least ±0.05, and more preferably matched to within ±0.01. This reduces the amount of scatter for one polarization state. The amount by which the light in the y-polarization is scattered is dependent on a number of factors, including the magnitude of the index mismatch, the ratio of one material phase to the other and the domain size of the disperse phase. Preferred ranges for increasing the amount by which the y-polarized light is forward scattered within the output coupling element 528 include a refractive index difference of at least about 0.05, a particle size in the range of about 0.5 μm to about 20 μm and a particle loading of up to about 10% or more.

Figure 5B:
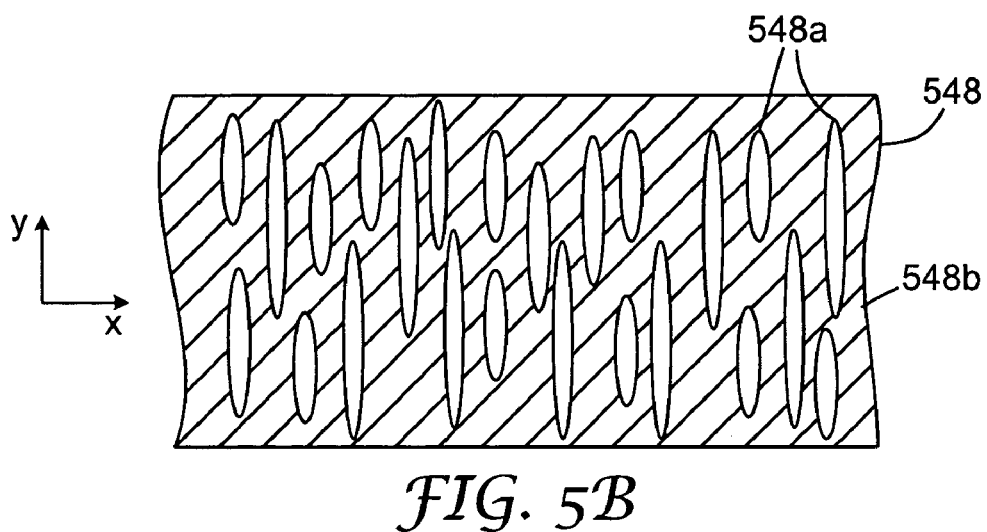
FIGS. 5B and 5C schematically illustrate different embodiments of polarization-sensitive output coupling elements for a controlled transmission mirror according to principles of the present invention.

Different arrangements of a polarization-sensitive output coupling element are available. For example, in the embodiment of output coupling element 548, schematically illustrated in FIG. 5B, the scattering elements 548a constitute a disperse phase of polymeric particles within a continuous matrix 548b. Note that this figure shows a cross-sectional view of the output coupling element 548 in the x-y plane. The birefringent polymer material of the scattering elements 548a and/or the matrix 548b may be oriented, for example, by stretching in one or more directions. Disperse phase/continuous phase polarizing elements are described in greater detail in co-owned U.S. Pat. Nos. 5,825,543 and 6,590,705, both of which are incorporated by reference.

Figure 5C:
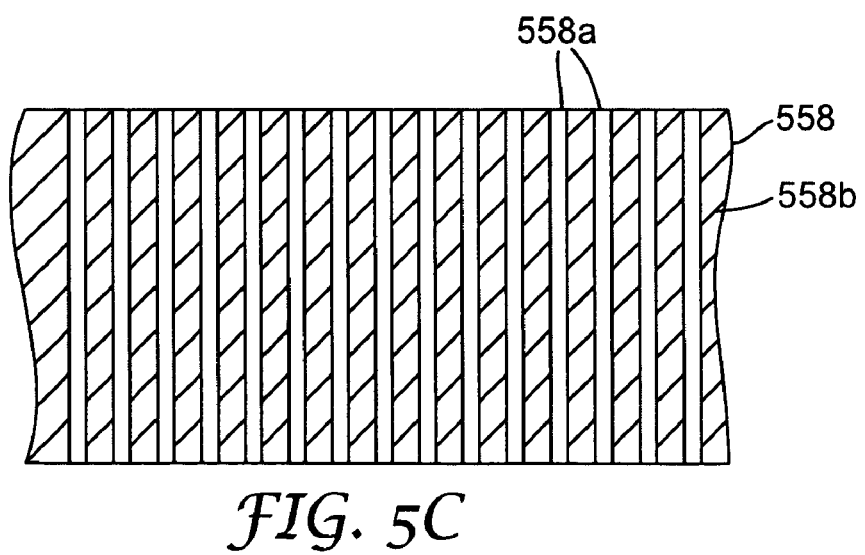

Another embodiment of polarization-sensitive output coupling element 558 is schematically illustrated in cross-section in FIG. 5C. In this embodiment, the scattering elements 558a are provided in the form of fibers, for example, polymer fibers or glass fibers, in a matrix 558b. The fibers 558a may be isotropic while the matrix 558b is birefringent, or the fibers 558a may be birefringent while the matrix 558b is isotropic, or the fibers 558a and the matrix 558b may both be birefringent. The scattering of light in the fiber-based, polarization sensitive output coupling element 558 is dependent, at least in part on the size and shape of the fibers 558a, the volume fraction of the fibers 558a, the thickness of the output coupling element 558, and the degree of orientation, which affects the amount of birefringence. Different types of fibers may be provided as the scattering elements 558a. One suitable type of fiber 558a is a simple polymer fiber formed of one type of polymer material that may be isotropic or birefringent. Examples of this type of fiber 558a disposed in a matrix 558b are described in greater detail in U.S. patent application Ser. No. 11/068,159, incorporated herein by reference. Another example of polymer fiber that may be suitable for use in the output coupling element 558 is a composite polymer fiber, in which a number of scattering fibers formed of one polymer material are disposed in a filler of another polymer material, forming a so-called "islands-in-the-sea" structure. Either or both of the scattering fibers and the filler may be birefringent. The scattering fibers may be formed of a single polymer material or formed with two or more polymer materials, for example a disperse phase in a continuous phase. Composite fibers are described in greater detail in U.S. patent application Ser. Nos. 11/068,157 and 11/068,158, both of which are incorporated by reference.

It will be appreciated that the input coupling element may also be polarization sensitive. For example, where unpolarized light is incident on the controlled transmission mirror, a polarization-sensitive scattering input coupling element may be used to scatter light of one polarization state into the controlled transmission mirror, allowing the light in the orthogonal polarization state to be reflected by the multilayer reflector back to the base reflector. The polarization of the reflected light may then be mixed before returning to the controlled transmission mirror. Thus, the input coupling element may permit light in substantially only one polarization state to enter the controlled transmission mirror. If the different layers of the controlled transmission mirror maintain the polarization of the light, then substantially only one polarization of light may be extracted from the controlled transmission mirror, even if a non-polarization-sensitive output coupling element is used. Both the input and output coupling elements may be polarization sensitive. Any of the polarization sensitive layers used as an output coupling element may also be used as an input coupling element.

Figure 6A:
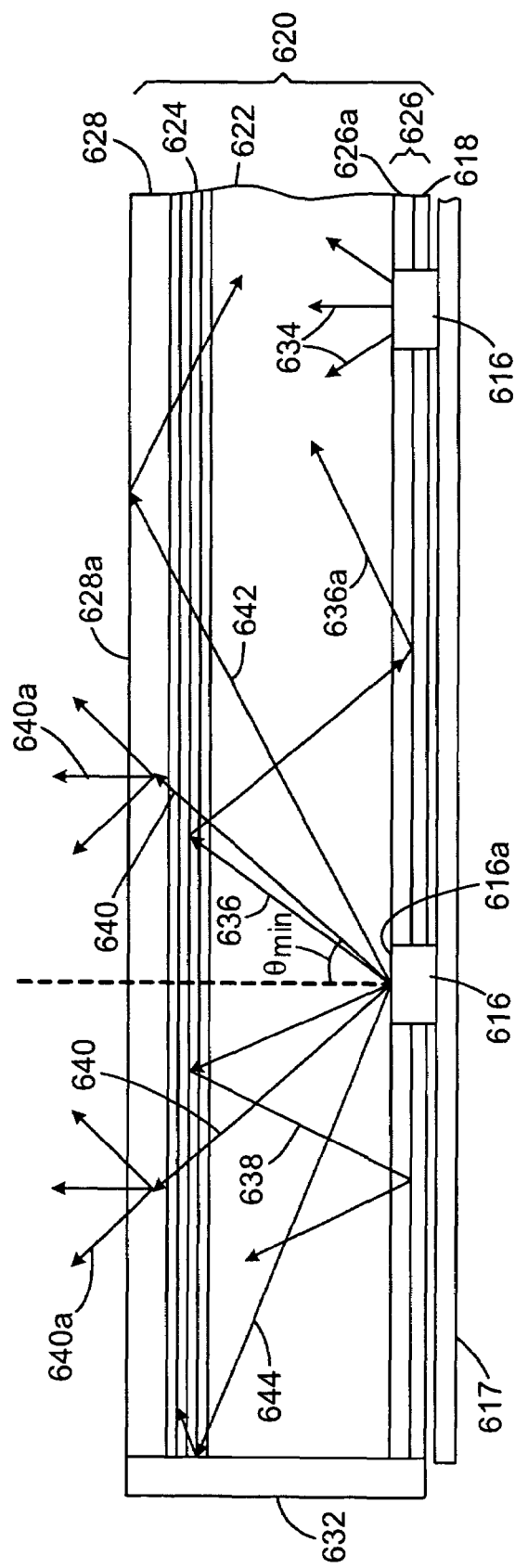
FIGS. 6A-6C schematically illustrate partial cross-sectional views of embodiments of illumination light units that use controlled transmission mirrors according to principles of the present invention.

In other embodiments of illumination light unit, particularly suitable for quasi-point sources such as LEDs, the light sources may be located within the controlled transmission mirror itself. One exemplary embodiment of such an approach is schematically illustrated in cross-section in FIG. 6A. The controlled transmission mirror 620 has a transparent layer 622, a multilayer reflector 624, and an output coupling element 628. The lower surface of the transparent layer 622 is provided with a diverting layer 626. Side reflectors 632 may be provided around the edge of the controlled transmission mirror 620. The side reflectors may be used to reflect any light that propagates out of the peripheral edge of the transparent layer 622.

Figure 6B:
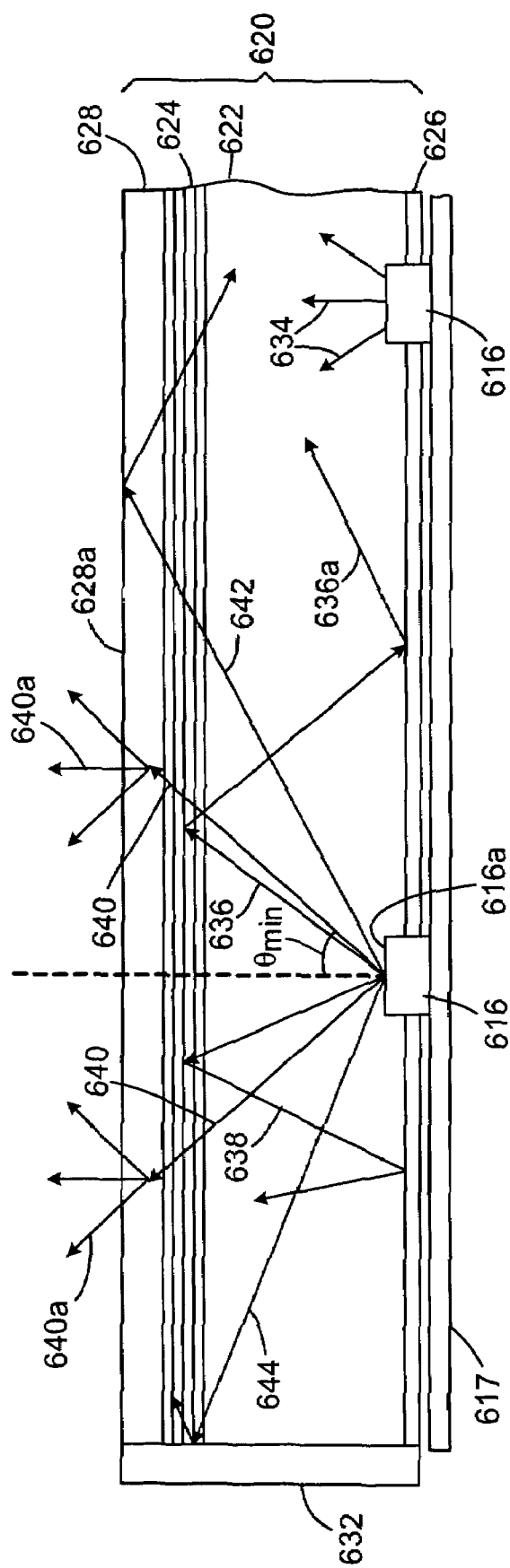

The diverting layer 626 may comprise a transmissive redirecting layer 626a that redirects light, for example any of the layers discussed above for use as an input coupling element, including bulk or surface diffusers or a structured surface. The transmissive redirecting layer 626a may be used with a base reflector 618 that reflects the light that has been transmitted through the transmissive redirecting layer 626a. The base reflector 618 may be any suitable type of reflector. The base reflector 618 may be a specular or a diffuse reflector and may be formed e.g., from a metalized reflector or a MOF reflector. The base reflector 618 may be attached to the transmissive redirecting layer 626a, as illustrated, or may be separate from the transmissive redirecting layer 626a. The diverting layer 626 is not referred to as an input coupling element in this embodiment, however, because it is not used for coupling the light into the controlled transmission mirror 620. Different configurations of the diverting layer 626 are possible. In some exemplary embodiments, for example as is schematically illustrated in FIG. 6B, the diverting layer 626 may simply comprise a diffuse reflector.

Light sources 616, for example LEDs, although other types of light sources may also be used, are arranged so that a light emitting surface 616a at least directly faces the transparent layer 622, or may even be recessed within the transparent layer 622. Thus, the light emitting surface 616a is disposed between the diverting layer 626 and the multilayer reflector 624. In this embodiment, light 634 from the light sources 616 enters the transparent layer 622 without being transmitted through the diverting layer 626 located at the lower surface of the transparent layer 622. A refractive index-matching material, for example a gel, may be provided between the light emitting surface 616a and the transparent layer 622 to reduce reflective losses and increase the amount of light coupled into the transparent layer 622 from the light source 616.

The light sources 616 may be arranged on a carrier 617. The carrier 617 may optionally provide electrical connections to the light sources 616 and may also optionally provide a thermal pathway for cooling the light sources 616.

Even when the light sources 616 directly inject light into the transparent layer 622 without passing through an input coupling element, the multilayer reflector 624 still controls the minimum angle, $\theta_{min}$, at which light propagating within the transparent layer 622 may exit out of the controlled transmission mirror 620. Some light, exemplified by light rays 636 and 638, is emitted into the transparent layer 622 from the light source 616 at an angle less than $\theta_{min}$, and is, therefore, reflected by the multilayer reflector 624. Some of the reflected light, for example ray 636, may be diverted by the diverting layer 626 before or after incidence at the base reflector 618 and reflected back into the transparent layer 622 at an angle greater than $\theta_{min}$ as ray 636a. Consequently, some of the light, e.g., ray 636a, is diverted into an angular range that permits subsequent transmission through the multilayer reflector 624 after only one reflection from the multilayer reflector 624. Another portion of the reflected light, for example light ray 638, may not be diverted at the diverting layer 626 and is, therefore, reflected from the base reflector 618 at an angle that will result in another reflection at the multilayer reflector 624.

Some of the light emitted from the light sources 616, exemplified by light rays 640 and 642, is emitted into the transparent layer 622 from the light source 616a at an angle equal to or greater than $\theta_{min}$, and is, therefore, transmitted through the multilayer reflector 624. Some of the transmitted light, for example ray 640, may be diverted by the output coupling element 628 and transmitted out of the controlled transmission mirror 620 as light 640a. Another portion of the transmitted light, for example ray 642, may pass through the output coupling element 628 without being diverted and, if it is incident at the upper surface 628a of the output coupling element 628 at an angle greater than the critical angle, $\theta_c$, is totally internally reflected back towards the transparent layer 622.

Some of the light 644 propagating within the transparent layer 622 may be reflected at the edge reflector 632. The edge reflector 632 may be used to reduce the amount of light escaping from the edge of the transparent layer 622, and thus reduces losses.

Figure 6C:
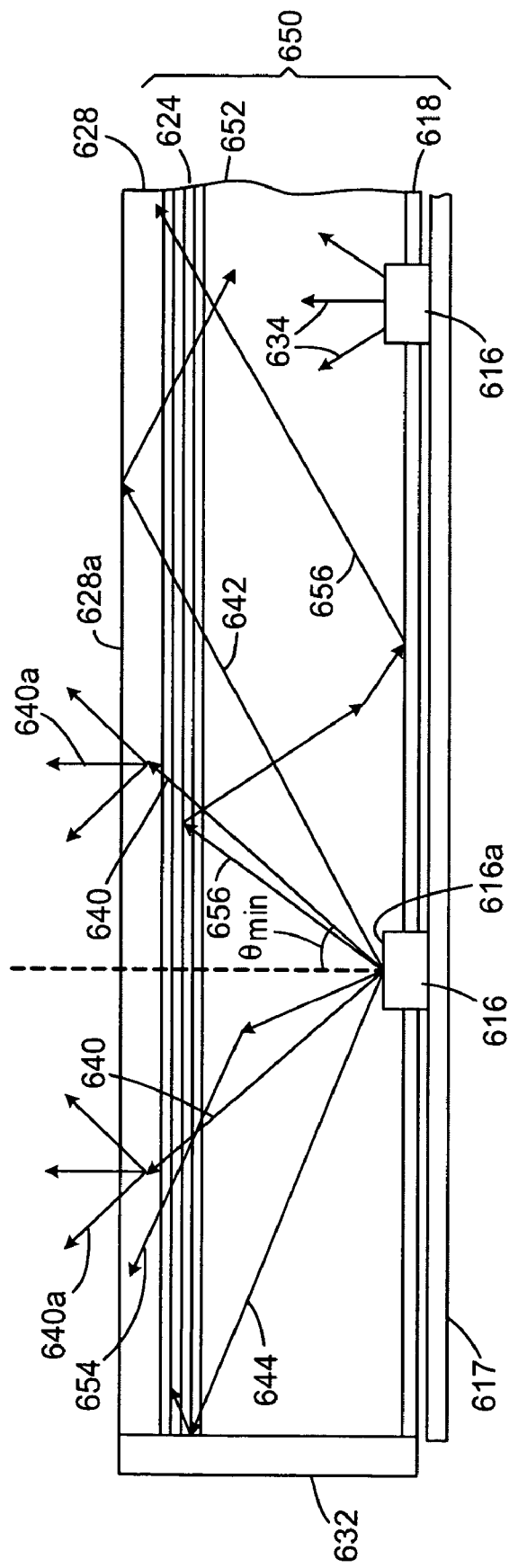

Another embodiment of a controlled transmission mirror 650 is schematically illustrated in FIG. 6C, in which the transparent layer 652 also operates as a diverting layer. In this embodiment, the transparent layer 652 contains some diffusing particles, so that some of the light passing therethrough is diverted. In one example, light beam 654, which propagates from the light source 616 at an angle less than $\theta_{min}$ may be diverted within the transparent layer 652 so as to be incident on the multilayer reflector 624 at an angle greater than $\theta_{min}$. In another example, light beam 656, which is reflected by the multilayer reflector 624, may be diverted within the transparent layer 652 so as to be reflected by the base reflector 618 at an angle greater than $\theta_{min}$.

Figure 7:
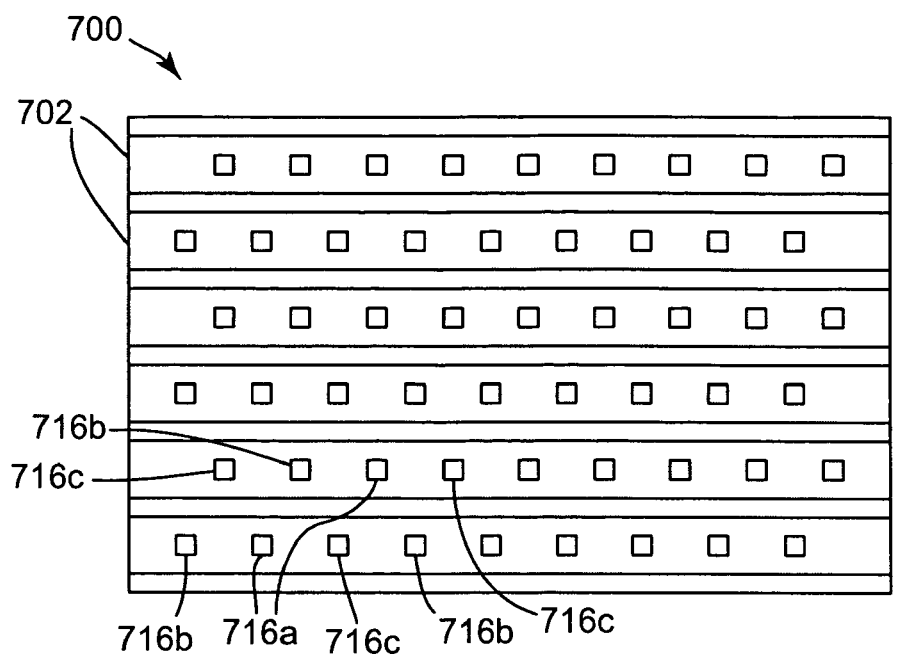
FIG. 7 schematically illustrates an embodiment of an arrangement of multiple illumination units that may be used in a backlight for a direct-lit display according to principles of the present invention.

In a direct-lit display, the illumination light unit may be configured as a single panel that is positioned behind the display panel. In another exemplary embodiment, schematically illustrated in FIG. 7, the backlight 700 may include a number of illumination light units 702. In the illustrated embodiment the light units 702 are configured as bars and each include a number of light sources 716a, 716b, 716c which may be located at staggered positions. The illumination light units 702 may have different shapes. In addition, the light sources 716a, 716b, 716c may produce light of different colors. For example, some light sources 716a may produce red light, while other light sources 716b produce green light and other light sources 716c produce blue light. The differently colored light sources 716a, 716b, 716c may be arranged so as to increase the degree to which the light of different colors is mixed so as to produce mixed light of a desired color uniformity.

Figure 8A:
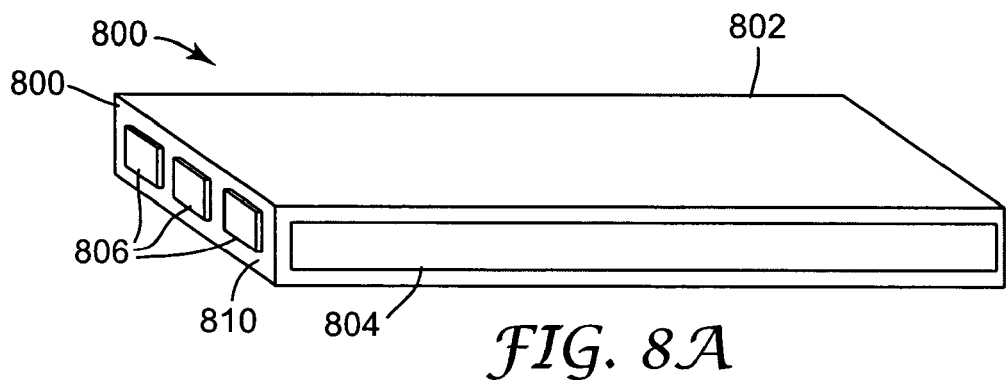
FIG. 8A schematically illustrates an exemplary embodiment of an illumination light unit that employs a controlled transmission mirror according to principles of the present invention.

Another embodiment of an illumination light unit 800 is shown in FIG. 8A, in which a number of light sources 806 are located at the end 810 of a reflecting cavity 802. In this exemplary embodiment, there is more than one light source 806 and the cross-sectional shape of the reflecting cavity 802 is rectangular. The light sources 806 may each generate light of the same color or of a different color. In the case where different light sources 806 generate light of different colors, the light from each light source 806 is mixed in the reflecting cavity 802 with the light from the other light sources 806 so that the light emerging from the controlled transmission mirror 804 may be a mixed color. For example, if there are three light sources 806 producing red, green and blue light respectively, the light emerging from the controlled emission mirror 804 may be a white color. The shade of the mixed color output light depends, inter alia, on the relative output powers of the different light sources and on the spectral properties of the controlled transmission mirror 804.

The extraction of light through the controlled transmission mirror 804 may be graded along the length of the controlled transmission mirror 804 so that the brightness of the light extracted from the illumination light unit 800 is relatively uniform along its length.

Figure 8B:
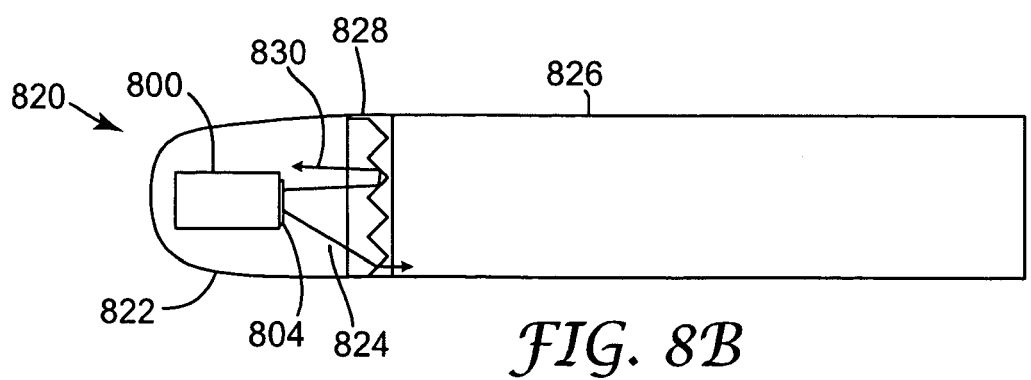
FIG. 8B schematically illustrates a backlight unit having an illumination light unit that directs light into a light guide, according to principles of the present invention.

An exemplary embodiment of a backlight 820 that uses the illumination unit 800 is schematically illustrated in FIG. 8B. The illumination unit 800 is at least partially surrounded by a reflector 822 and is positioned so that the light 824 emitted from the controlled transmission mirror 804 is directed towards a lightguide 826. An optional brightness enhancing layer 828, for example a prismatic brightness enhancing layer, may be positioned between the illumination unit 800 and the lightguide 826. The brightness enhancing layer 828 reduces the angular spread of the light entering the lightguide 826 and may promote lateral spreading in the lightguide 826. Some of the light, for example ray 830, may be reflected by the brightness enhancing layer 828. The reflected light 830 may be redirected back towards the lightguide 826 by the controlled transmission mirror 804 or some other reflector in the illumination unit 800, or by the reflector 822 that surrounds the illumination light unit 800.

Figure 9A:
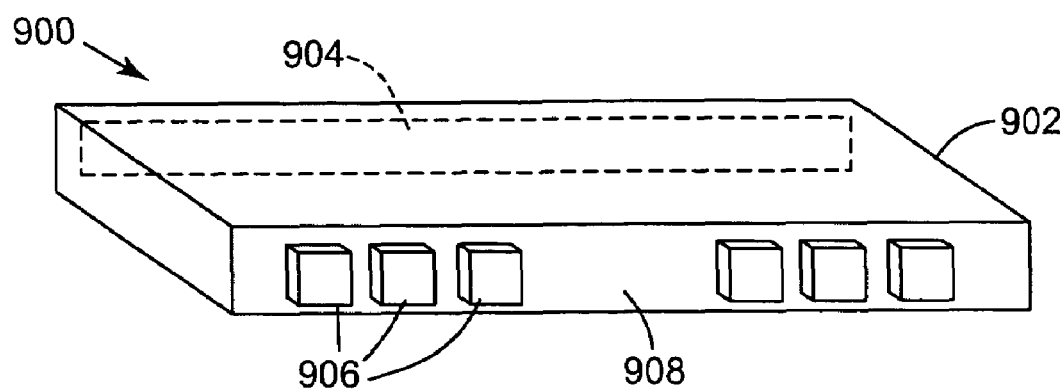
FIGS. 9A and 9B schematically illustrate embodiments of illumination light units that employ controlled transmission mirrors according to principles of the present invention.

Another embodiment of an illumination light unit 900 is shown in FIG. 9A, in which light sources 906 are located on a face 908 of a reflecting cavity 902 opposing a controlled transmission mirror 904. In this exemplary embodiment, there is more than one light source 906 and the cross-sectional shape of the reflecting cavity 902 is rectangular. The light sources 906 may each generate light of the same color or of different colors. The reflecting cavity 902 may be used to mix the light from the different light sources 906 so that the intensity profile of the light output from the controlled transmission mirror 904 is relatively uniform. Furthermore, in the case where the light sources 906 produce light of different colors, the different colored light is mixed so that the light emerging from the controlled transmission mirror 904 is a mixed color. For example, if there are three light sources 906 producing red, green and blue light respectively, the light emerging from the controlled emission mirror 904 may be a white color. The light from the light sources 906 may be mixed within the reflecting cavity 902 so that the brightness of the light extracted from the illumination light unit may be relatively uniform.

Figure 9B:
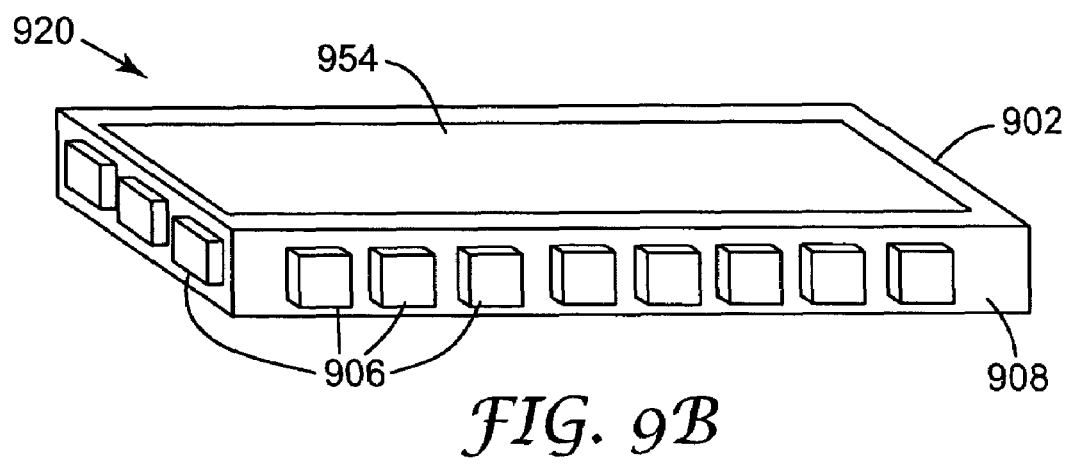

Another embodiment of an illumination unit 920 is schematically illustrated in FIG. 9B, in which the controlled transmission mirror 954 is positioned on the top of the reflecting cavity 902. Additional light sources 906 may be placed around the edge of the reflecting cavity 902.

Figure 10A:
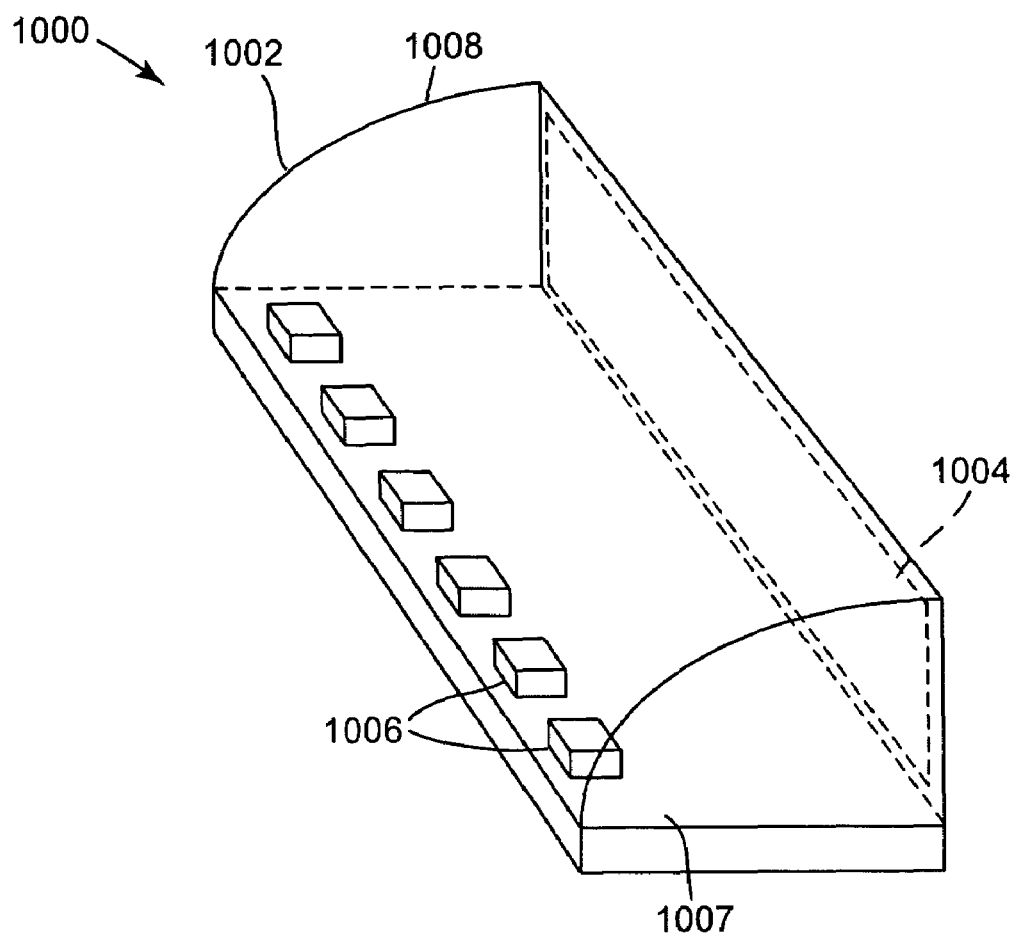
FIGS. 10A and 10B schematically illustrate another exemplary embodiment of light illumination units having a controlled transmission mirror according to principles of the present invention.
Figure 10B:
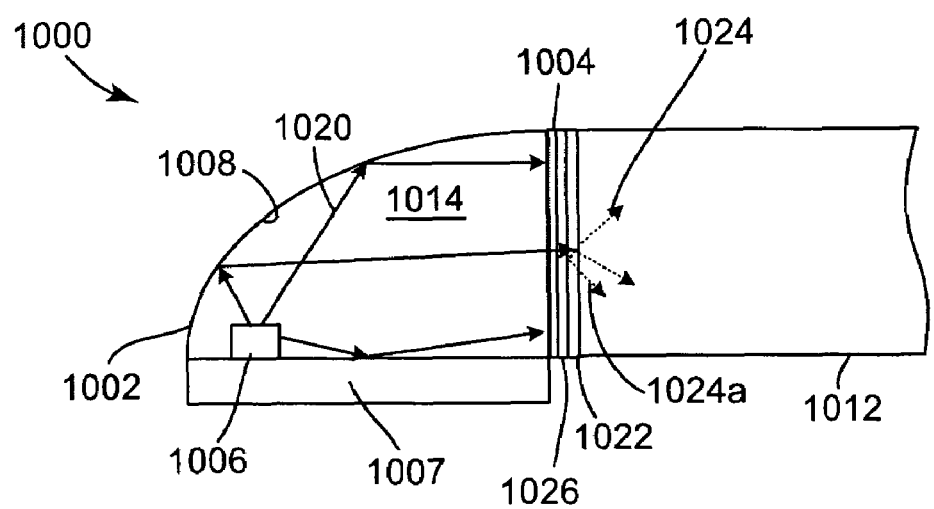

Another embodiment of an illumination light unit 1000 is schematically illustrated in FIGS. 10A and 10B. The unit 1000 has a reflecting cavity 1002 that includes a reflector 1008 and a controlled transmission mirror 1004. One or more light sources 1006 are provided on a base 1007. The base 1007 may be reflective. The base 1007 may also provide electrical connections for driving the light source 1006 and provide a heatsink for removing heat from the light source 1006.

Light 1020 from the light sources 1006 is reflected by the reflector 1008 towards the controlled transmission mirror 1004. The reflector 1008 may have any suitable shape and may be curved (as illustrated) or flat. If the reflector 1008 is curved, the curve may be any suitable type of curve, for example, elliptical or parabolic. In the illustrated embodiment, the reflector 1008 is curved in one dimension. The reflector 1008 may be any suitable type of reflector, for example a metalized reflector, or a multilayer dielectric reflector, which includes multiple layer polymer film (MOF) reflectors. Light that is transmitted through the controlled transmission mirror 1004 may be coupled into a light guide 1012 for back-illuminating a display device. The space 1014 within the reflecting cavity 1002 may be filled or may be empty. In embodiments where the space 1014 is filled, for example, with a transparent optical body, then the reflector 1008 may be attached to the outer surface of the body. In other embodiments, there is an empty space between the light source 1006 and the reflector 1008. Different configurations of reflective cavities are described further in U.S. patent application Ser. No. 10/701,201 and, incorporated herein by reference.

The light sources 1006, for example LEDs, may all produce light of the same color, or different LEDs may produce light of different colors, for example, red, green and blue. In some exemplary embodiments, an optional wavelength converter 1022 may be used to change the color of at least some of the light 1020. For example, where the light 1020 is blue or ultraviolet, the wavelength converter 1022 may be used to convert some of the light to green and/or red light 1024 (dashed lines). A low-pass reflector 1026 may be positioned between the controlled transmission mirror 1004 and the wavelength converter 1022. The low-pass reflector 1024 transmits the relatively short wavelength light 1020 from the light sources 1006 and reflects light 1024*a* from the wavelength converter 1022 towards the light guide 1012.

In another embodiment, the controlled transmission mirror 1004 may use as an output coupling element a diffuser having a matrix loaded with phosphor particles. In such a configuration, some of the light transmitted through the multilayer reflector is converted by the phosphor to light of a different wavelength. Light that is not diffused or converted by the particles may be totally internally reflected by the matrix layer so as to pass back through the multilayer reflector.

Another embodiment of an illumination unit 1100 that may be used as a backlight for a display device is schematically illustrated in FIG. 11A. In this embodiment, one or more light sources 1106 are disposed between first and second reflectors 1102, 1104. In some embodiments, the light sources 1106, which may be LEDs, may emit substantially away from the second reflector 1102, in which case an optional curved reflector 1108 may be provided to direct the light 1110 along the space between the first and second reflectors 1102, 1104. In other embodiments, not illustrated, the light sources 1106 may substantially emit light sideways, in a direction along the space between the first and second reflectors 1102, 1104.

The first and second reflectors 1102, 1104 may be specular reflectors, for example ESR film available from 3M Company, St. Paul, Minn. A folding reflector 1112 is positioned at each end to fold the light 1110 into a reflecting cavity formed between the second reflector 1104 and a controlled transmission mirror 1114. The light 1110 is eventually directed out of the unit 1100 through the controlled transmission mirror 1114. The first reflector 1102 may be mounted on a base 1116 that provides electrical power to the light sources 1106 and may also operate as a thermal sink to remove heat from the light sources 1106.

The light sources 1106 may be arranged in different patterns on the first reflector 1102. In the arrangement illustrated in FIG. 11B, which shows a slice through the unit 1100 between the first and second reflectors 1102, 1104, the light sources 1106 are arranged in a linear pattern, with the light being directed towards the edges 1120*a*, 1120*b*. In the arrangement schematically illustrated in FIG. 12C, the light sources 1106 and reflector 1108 are arranged in a radial pattern, so that the light is directed radially outwards to the folding reflector 1112 situated around the periphery of the first reflector 1102.

An illumination light unit as described herein is not restricted to use for illuminating a liquid crystal display panel. The illumination light unit may also be used wherever discrete light sources are used to generate light and it is desirable to have uniform illumination out of a panel that includes one of more of the discrete light sources. Thus, the illumination light unit may find use in solid state space lighting applications and in signs, illuminated panels and the like.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical system, comprising:
an image-forming panel having an illumination side; and
a backlight unit disposed to the illumination side of the image-forming panel, the backlight unit comprising:
at least first and second light sources, the first light source producing light at a first wavelength and the second light source producing light at a second wavelength different from the first wavelength, and
a reflecting cavity having at least one reflecting surface and a controlled transmission mirror, the light from the first and second light sources being reflected within the reflecting cavity, the controlled transmission mirror comprising an input coupling element, an output coupling element and a first multilayer reflector between the input and output coupling elements, the first multilayer reflector being reflective for normally incident light from the first and second light sources, the input coupling element redirecting at least some of the light propagating from the first and second light sources in a direction substantially perpendicular to the first multilayer reflector into a direction that is transmitted through the first multilayer reflector.

2. A system as recited in claim 1, wherein the output coupling element comprises at least one of a bulk diffuser, a surface diffuser, a structured surface and a totally internally reflecting output coupling element.

3. A system as recited in claim 1, wherein the input coupling element comprises at least one of a bulk diffuser, a surface diffuser, a structured surface and a total internal reflection input coupling element.

4. A system as recited in claim 1, wherein the controlled transmission mirror further comprises a transparent layer disposed between the input and output coupling elements.

5. A system as recited in claim 4, wherein the transparent layer is disposed between the first multilayer reflector and the output coupling element.

6. A system as recited in claim 4, wherein the first multilayer reflector is disposed between the transparent layer and the output coupling element.

7. A system as recited in claim 4, further comprising a second multilayer reflector disposed between the input and output coupling elements, the transparent layer being disposed between the first and second multilayer reflectors.

8. A system as recited in claim 4, further comprising a side reflector disposed adjacent at least one edge of the transparent layer.

9. A system as recited in claim 1, wherein the output coupling element couples light out of the backlight unit in substantially only one polarization state.

10. A system as recited in claim 9, wherein the output coupling element comprises a disperse polymeric phase in a continuous polymeric matrix, at least one of the disperse polymeric phase and the continuous polymeric matrix comprising birefringent polymeric material.

11. A system as recited in claim 9, wherein the output coupling element comprises fibers disposed within a polymeric matrix, at least one of the fibers and the polymeric matrix comprising birefringent polymeric material.

12. A system as recited in claim 1, wherein the image-forming panel comprises a liquid crystal display (LCD) panel, and further comprising a first polarizer disposed on the viewing side of the LCD panel and a second polarizer disposed on the illumination side of the LCD panel.

13. A system as recited in claim 1, further comprising a controller coupled to control an image displayed by the image-forming panel.

14. A system as recited in claim 1, wherein the first and second light sources comprise light emitting diodes (LEDs).

15. A system as recited in claim 1, wherein the first light source comprises an LED and the second light source comprises a phosphor illuminated by the LED.

16. A system as recited in claim 1, wherein the first multilayer reflector comprises a polymeric multilayer film.

17. A system as recited in claim 1, further comprising one or more light management films disposed between the backlight unit and the image-forming panel.

18. A system as recited in claim 17, wherein the light management films comprise at least one of a reflective polarizer and a prismatic brightness enhancing film.

19. A system as recited in claim 1, wherein the first light source is capable of generating red light, the second light source is capable of generating green light and the backlight unit further comprises a third light source capable of generating blue light.

20. An illumination light unit, comprising:
at least a first light source capable of generating illumination light at a first wavelength and a second light source capable of generating illumination light at a second wavelength different from the first wavelength; and
a reflecting cavity having one or more reflectors and a controlled transmission mirror disposed at an output of the reflecting cavity, the controlled transmission mirror comprising an input coupling element, an output coupling element and a first multilayer reflector disposed between the input and output coupling elements, at least some of the illumination light from the first and second light sources being reflected within the reflecting cavity by the one or more reflectors and being transmitted out of the reflecting cavity through the controlled transmission mirror.

21. A unit as recited in claim 20, wherein the controlled transmission mirror further comprises a transparent layer disposed between the input and output coupling elements.

22. A unit as recited in claim 20, wherein the first and second light sources comprise light emitting diodes (LEDs).

23. A unit as recited in claim 20, further comprising a third light source capable of generating light at a third wavelength different from the first and second wavelengths.

24. A unit as recited in claim 23, wherein the first, second and third wavelengths are red, green and blue wavelengths respectively.

25. A unit as recited in claim 20, further comprising a light wavelength converter disposed to convert the wavelength of the illumination light output through the controlled transmission mirror.

26. A unit as recited in claim 20, wherein the reflecting cavity is elongated along a longitudinal axis and has a first end, and the controlled transmission mirror is on a first side of the reflecting cavity, substantially parallel to the longitudinal axis.

27. A unit as recited in claim 26, wherein the at least a first light source is disposed at the first end of the reflecting cavity.

28. A unit as recited in claim 26, wherein the at least a first light source is disposed on a second side of the reflecting cavity.

29. A unit as recited in claim 20, wherein the reflecting cavity comprises at least one curved reflector on an optical path between the one or more light sources and the controlled transmission mirror.

30. A unit as recited in claim 29, wherein the at least one curved reflector is curved in one dimension only.

31. A unit as recited in claim 29, wherein the at least one curved reflector comprises at least two curved reflectors, each of the curved reflectors being curved in two dimensions.

* * * * *

UNITED STATES PATENT AND TRADEMARK OFFICE
CERTIFICATE OF CORRECTION

| | | |
|---|---|---|
| PATENT NO. | : 7,322,731 B2 | Page 1 of 1 |
| APPLICATION NO. | : 11/166722 | |
| DATED | : January 29, 2008 | |
| INVENTOR(S) | : Kenneth A. Epstein | |

It is certified that error appears in the above-identified patent and that said Letters Patent is hereby corrected as shown below:

On Title Page
Item [56], References Cited, U.S. PATENT DOCUMENTS, Delete "Oderkirk" and insert -- Ouderkirk --, therefor.

On Title Page
Item [56], References Cited, FOREIGN PATENT DOCUMENTS, Delete "2002/03153" and insert -- 2002/031053 --, therefor.

Column 1
Line 11, After "having" insert -- attorney docket no. 60499US002; --.
Line 15, After "having" insert -- attorney docket no. 60709US002; --.
Line 17, After "having" insert -- attorney docket no. 60975US002; --.
Line 21, After "having" delete "." and insert -- attorney docket no. 60976US002. --, therefor.

Column 11
Line 60, Delete "no" and insert -- $n_0$ --, therefor.

Column 13
Line 44, After "herewith," insert -- and having attorney docket no. 60499US002, --.

Signed and Sealed this

Twenty-first Day of October, 2008

JON W. DUDAS
*Director of the United States Patent and Trademark Office*